(12) United States Patent  (10) Patent No.: US 7,482,907 B2
Denison et al.  (45) Date of Patent: *Jan. 27, 2009

(54) ELECTRONIC ACCESS CONTROL DEVICE

(75) Inventors: William D. Denison, Palos Hills, IL (US); Lawrence C. Brownfield, Downers Grove, IL (US); Bradley S. Silvers, Oswego, IL (US)

(73) Assignee: Micro Enhanced Technology, Inc., Wood Dale, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,998

(22) Filed: Jul. 7, 2004

(65) Prior Publication Data

US 2004/0246098 A1 Dec. 9, 2004

Related U.S. Application Data

(63) Continuation of application No. 10/024,945, filed on Dec. 19, 2001, now Pat. No. 6,977,576, which is a continuation of application No. 08/760,062, filed on Dec. 4, 1996, now Pat. No. 6,359,547, which is a continuation-in-part of application No. 08/339,555, filed on Nov. 15, 1994, now Pat. No. 5,617,082.

(51) Int. Cl.
*B60R 25/00* (2006.01)
(52) U.S. Cl. ........................ 340/5.73; 340/5.7; 340/5.2; 340/5.1
(58) Field of Classification Search ................ 340/5.73, 340/5.2, 5.7, 5.64, 5.51, 5.52, 5.1
See application file for complete search history.

(56) References Cited

U.S. PATENT DOCUMENTS

| | | | |
|---|---|---|---|
| 4,053,939 A | 10/1977 | Nakauchi et al. | |
| 4,353,064 A | 10/1982 | Stamm | |
| 4,354,189 A | 10/1982 | Lemelson | |
| 4,391,204 A | 7/1983 | Mitchell et al. | |
| 4,509,093 A | 4/1985 | Stellberger | |
| 4,674,454 A | 6/1987 | Phairr | |

(Continued)

OTHER PUBLICATIONS

U.S. Appl. No. 10/885,948, filed Jul. 7, 2004, Denison et al.

(Continued)

*Primary Examiner*—Brian A Zimmerman
*Assistant Examiner*—Samuel J Walk
(74) *Attorney, Agent, or Firm*—Factor & Lake, Ltd.

(57) ABSTRACT

An electronic lock utilizes two microprocessors remote from each other for enhanced security. The first microprocessor is disposed close to an input device such as a keypad, and the second microprocessor is disposed close to the lock mechanism and well protected from external access. The first microprocessor transmits a communication code to the second microprocessor when it receives via the input device an access code that matches a preset access code. The second microprocessor opens the lock if the transmitted communication code matches a preset communication code. The dual-microprocessor arrangement is advantageously used in a voice controlled access control system and in a motorcycle ignition control system. The present invention further provides an electronic access control system which has a master electronic key having a preset number of access, and an electronic alarm system for a bicycle that has a remote control mounted in the helmet of the rider.

151 Claims, 17 Drawing Sheets

U.S. PATENT DOCUMENTS

| | | | |
|---|---|---|---|
| 4,688,036 | A | 8/1987 | Hirano et al. |
| 4,709,202 | A | 11/1987 | Koenck et al. |
| 4,766,746 | A | 8/1988 | Henderson et al. |
| 4,827,395 | A | 5/1989 | Anders et al. |
| 4,839,639 | A | 6/1989 | Sato et al. |
| 4,918,431 | A | 4/1990 | Borras |
| 4,952,864 | A | 8/1990 | Pless et al. |
| 5,021,776 | A | 6/1991 | Anderson et al. |
| 5,090,222 | A | 2/1992 | Imran |
| 5,109,530 | A | 4/1992 | Stengel |
| 5,113,182 | A | 5/1992 | Suman et al. |
| 5,184,855 | A | 2/1993 | Waltz et al. |
| 5,280,518 | A | 1/1994 | Danler et al. |
| 5,347,419 | A | 9/1994 | Caron et al. |
| 5,349,345 | A | 9/1994 | Vanderschel |
| 5,506,575 | A | 4/1996 | Ormos |
| 5,559,505 | A | 9/1996 | McNair |
| 5,561,420 | A | 10/1996 | Kleefeldt et al. |
| 5,602,536 | A | 2/1997 | Henderson et al. |
| 5,625,338 | A | 4/1997 | Pildner et al. |
| 5,625,349 | A | 4/1997 | Disbrow et al. |
| 5,661,470 | A | 8/1997 | Karr et al. |
| 5,673,034 | A | 9/1997 | Saliga |
| 5,742,238 | A | 4/1998 | Fox |
| 6,130,602 | A | 10/2000 | O'Toole et al. |
| 6,359,547 | B1 | 3/2002 | Denison et al. |
| 7,019,615 | B2 | 3/2006 | Denison et al. |
| 2004/0178884 | A1 | 9/2004 | Denison et al. |
| 2004/0178885 | A1 | 9/2004 | Denison et al. |

OTHER PUBLICATIONS

AMSEC Invoice for Wall Safe WS1014 with Optional KPL 100 Installed, Nov. 6, 1992.

Underwriters Laboratories Inc. report on High Security Electronic Locks, Type 2, Mar. 9, 1992.

American Security Products Co. price list excerpts regarding, among other things, KPL 100, Oct. 15, 1990.

Locksmith Ledger Advertisement for American Security Products Co. regarding, among other things, KPL 100, Dec. 1990.

Excerpts from American Security Products Co. Product Catalog regarding, among other things, KPL 100, Jan. 1992.

American Security Products Co. KPL 100 Flyer, 1992.

American Security Prodcuts Co, retail Price List excerpts regarding, among other things, KPL100, Jan. 1, 1993.

¼ page advertisement for AMSEC, Apr. 1992.

Dallas Semiconductor Corporation data sheet for DS2405, 1995.

Letter from Hal Mottet of American Security Products Company to Michael Lake, on behalf of Micro Enhanced Technology, Inc., dated received on Jan. 17, 2005.

Letter from Hal Mottet of American Security Products Company to Michael Lake, on behalf of Micro Enhanced Technology, Inc., dated received on Jan. 14, 2005.

Letter from Michael Lake, on behalf of Micro Enhanced Technology, Inc., to Hal Mottet of American Security Products Company, dated Dec. 21, 2004.

Letter from F. Eugene Logan, on behalf of American Security Products Company, to Y. Kurt Chang, dated Feb. 2, 1999.

Letter from Y. Kurt Chang, on behalf of Micro Enhanced Technology, Inc., to Frank Cademartori of American Security Products Company, dated Jan. 12, 1999.

ELECTRONIC ACCESS CONTROL DEVICE

RELATED APPLICATIONS

This application is a continuation of U.S. patent application Ser. No. 10/024,945 filed on Dec. 19, 2001, now U.S. Pat. No. 6,977,576 which is a continuation of U.S. patent application Ser. No. 08/760,062 filed on Dec. 4, 1996 now U.S. Pat. No. 6,359,547, which is a continuation-in-part of U.S. patent application Ser. No. 08/339,555 now U.S. Pat. No. 5,617,082 of Denison et al., similarly entitled "ELECTRONIC ACCESS CONTROL DEVICE UTILIZING A SINGLE MICROCOMPUTER INTEGRATED CIRCUIT," filed on Nov. 15, 1994, wherein all of the above related applications are incorporated by reference. This application is also related to co-filed application U.S. Ser. No. 10/885,948 entitled, "ELECTRONIC ACCESS CONTROL DEVICE."

FIELD OF THE INVENTION

This invention relates generally to access control devices, and more particularly to electronic access control devices controlled by microprocessors.

BACKGROUND OF THE INVENTION

An electronic access control device, such as an electronic combination lock or an electronic alarm system, allows the user to activate or deactivate the access control without the use of the conventional key and mechanical lock mechanism. With the development of microprocessor integrated circuits, it is becoming common to implement microprocessor-based control circuitry in electronic access control devices. Electronic access control devices are known, for example, from U.S. Pat. No. 5,021,776. In this device, and other common electronic access control devices, a microprocessor is used in combination with a keypad and an electrically programmable read only memory (EPROM). The microprocessor compares the combination entered in the keypad by the operator with the combination stored in the EPROM. If the two combinations match, the microprocessor opens the lock.

There are problems associated with previous electronic access control devices. One area of problems concerns the manufacture of the devices, including the difficulty in programming the non-volatile memory, such as the EPROM, for storing the access code and other useful information for the operation of the device. EPROMs, which usually require parallel programming, interrupt the manufacturing process in that they restrict when the manufacturer can program the device. A manufacturer would prefer to program the access code into the EPROM as the last step in the manufacturing process. However, with parallel EPROMs, burning in the code after the device has manufactured is difficult. After the device is soldered together, the manufacturer must contend with integrated circuit pin clips and must worry about interference with other circuitry on the manufactured device. Further, manufacturing, with known electronic access control devices, requires many pin connections which increase manufacturing cost.

Related to the problems associated with the pin connections of the microprocessor integrated circuit (IC) is the concern of device reliability and ease of use. When the device contains a significant number of pin connections, the reliability of the device decreases. Further, serial access to the EPROM to determine the electronic access code is easier than parallel access in terms of pin connections. When the user forgets or loses the access code in the EPROM, a locksmith could plug into the device and retrieve the access code serially without breaking into the safe. However, with parallel EPROMs, serial access is not available.

One common problem associated with previous electronic locks is their potential vulnerability to tampering. A conventional electronic lock receives an access code via an input device such as a keypad or electronic key reader, verifies the access code, and then energizes a solenoid, relay, motor, or the like to open the lock. This arrangement is vulnerable to tampering because if the control circuit is somehow broken in or removed, one can open the lock by "hot-wiring" the control lines for activating the lock-opening mechanism.

Another technically challenging problem is related to the need to provide electrical energy to power the operation of the electronic access control device. For many applications, it is desirable to use a portable energy source, such as a battery, to power the access control device. A battery, however, has a rather limited amount of electrical energy stored therein. Thus, it is extremely important to reduce the power consumption of the control circuit and peripheral devices of the access control device to extend the service life of the batteries.

For instance, it is typical to use a solenoid-operated lock in an electronic lock. The power consumed by the solenoid in opening the lock is quite significant. Thus, the battery can be rapidly drained by the repeated operation of the solenoid. As another example, it is common to include a low-battery detection circuit in an electronic lock to provide a warning signal to the user when the battery voltage falls below a predetermined level. The operation of the low-battery detection circuit, however, also consumes electrical energy and contributes to the draining of the battery.

Some electronic locks are provided with electronic keys. When an electronic key is presented to a key reader of an associated electronic lock, it transmits an access code to the electronic lock. By using an electronic key, the user does not have to enter manually the access code by means of a keypad. In certain applications, a remote control unit is used which has a radio transmitter to send the access code to the lock without direct electrical contact with the electronic lock.

Although electronic keys are a convenient feature, they have their associated problems. One problem is related to the unauthorized use of the keys. For example, many hotels provide safes equipped with electronic locks in their hotel rooms. Such safes typically allow the hotel guests to set their own access codes. In cases where the hotel guests forget the access codes they set, the hotel management has to send someone with a master key which has a master access code stored therein to open the safes. There is a danger that such a master key may be used for unauthorized opening of other safes in the hotel.

Another problem associated with the use of an electronic key or a wireless access code transmitter is that the key or the transmitter may be lost easily, or the user may simply forget to bring the key or transmitter. This problem is especially serious if the electronic access control device does not provide other means, such as a keypad, for entering the access code.

SUMMARY OF THE INVENTION

It is a general object of the present invention to develop an electronic access control device which is easier to manufacture and more reliable to operate, and provides improved security to prevent tampering or unauthorized access.

It is an object of the present invention to provide an electronic access control device with a non-volatile memory for storing an access code that permits the manufacturer of the device to easily insert the access code into the device and then read out the code for verification.

It is an object of the present invention to provide an electronic access control device that provides significantly enhanced security and reduced vulnerability to tampering as compared to previous electronic locks.

It is an object of the present invention to develop an electronic access control device which has fewer total components and pin connections for smaller device area and greater reliability.

It is another object of the present invention to develop an electronic access control device with a solenoid-operated lock which has reduced power consumption by reducing the power used in operating the solenoid.

It is a related object of the present invention to develop an electronic access control device that has an improved low-battery detection circuit which has minimized energy consumption.

It is a more specific object of the present invention to provide an electronic alarm system for a bicycle that uses a wireless transmitter for sending an access code for activating and deactivating the alarm system and that is configured to help the rider of the vehicle to prevent losing the transmitter or forgetting to bring the transmitter.

It is another more specific object of the present invention to provide an electronic access control system with a master key for a plurality of remote electronic locks that effectively prevents the unauthorized use of the master key.

The present invention accomplishes these and other objects and overcomes the drawbacks of the prior art. First, there is provided an electronic access control device which reduces the number of pin connections required to manufacture, to read, to program, and to operate the device. The device multiplexes the inputs and outputs of the microprocessor IC so that a single pin can function as an input in one mode and an output in another. The microprocessor determines, based on the mode of operation, whether a pin functions as an input or an output.

The electronic access control device of the present invention has a communication port connected to selected pins of the microprocessor IC for accessing the non-volatile memory for storing an access code. Through the communication port, the manufacturer can interact with the microprocessor to store an access code into the non-volatile memory and retrieve the access code for verification. By virtue of the provision of the communication port, the factory-programmed access code can be saved into the non-volatile memory after the control circuitry is completely assembled.

In one embodiment, the electronic access control device has a microprocessor IC with a plurality of pins, a keypad for inputting user-entered access codes and a non-volatile memory, such as an EEPROM, external of the microprocessor for storing an access code. At least one of the IC pins is connected to both the keypad and the non-volatile memory for receiving the user-entered code from the keypad and transferring data between the IC and the memory.

In accordance with the object of the invention to reduce the vulnerability to tampering, the present invention provides an electronic access control device which has two microprocessors. The first microprocessor is preferably disposed close to the user interface such as a keypad or an electronic key reader. The second microprocessor is preferably disposed close to the lock mechanism and substantially shielded from external access. When the first microprocessor receives a user-entered code, it compares the entered code to a stored access code. If those two codes match, the first microprocessor transmits a special communication code to the second microprocessor. The second IC opens the lock if the transmitted communication code matches a stored communication code. Since the second IC is well protected from external access, the risk of tampering by hard-wiring is significantly reduced.

This dual-microprocessor arrangement is advantageously used in a voice activated access control system which has a first microprocessor circuit having speech recognition capability, and a second microprocessor circuit which carries out a commanded operation when receiving a correct communication code from the first microprocessor circuit. The first microprocessor circuit may include a transmitter for wireless transmission of the communication code.

The dual-microprocessor arrangement is also advantageously used in a motorcycle ignition switch control system for turning on accessories or starting the engine in response to the ignition key position.

The present invention also provides an effective solution to the problem associated with the intensive need for power of the solenoid. In the present invention, the electronic access control device pulses the power to the solenoid so that the overall power consumption in operating the solenoid is lower. Thus, the battery has a longer life and the lock has an increased number of accesses.

In accordance with a related aspect of the present invention, the electronic access control device employs a low-battery detection circuit that is turned off and therefore consumes no electrical power when the microprocessor is in the sleep mode. The low-battery detection circuit uses a combination of a voltage divider and a transistor to compare the battery voltage and the regulated voltage for determining whether the battery voltage is low, and uses another transistor in series with the voltage divider to selectively turn the current through the voltage divider on and off. When the current through the voltage divider is off, the low-voltage detection circuit does not consume electrical energy.

In the case of an electronic access control system with a master key and a plurality of remote electronic locks, the present invention effectively prevents unauthorized use of the master key. In accordance with the present invention, the master key has a master access code and a number of access stored therein. Each of the remote electronic lock has a key reader to communicating with the master key. When an electronic lock detects in the key a correct master access code and a number of access that is at least one, it opens the associated lock and decrements the number of access in the key by one.

In accordance with another aspect of the present invention, there is provided an electronic alarm system for a bicycle or a similar manually powered vehicle. The alarm system includes a remote control unit installed in the helmet of the rider of the bicycle, and an electronic alarm installed on the bicycle. The remote control unit has a transmitter for the wireless transmission of control signals to activate or deactivate the alarm on the bicycle. The alarm on the bicycle includes a motion detector for sensing the movement of the bicycle. If the motion detector detects the movement of the vehicle when the electronic alarm is activated, the alarm is set off.

It is a feature of the present invention to mount the remote control in the helmet of the rider of the bicycle. By virtue of this arrangement, the rider is more likely to remember to wear the helmet. The risk of losing the remote control is also substantially eliminated.

These and other features and advantages of the invention will be more readily apparent upon reading the following description of the preferred embodiment of the invention and upon reference to the accompanying drawings wherein:

Figure 1:
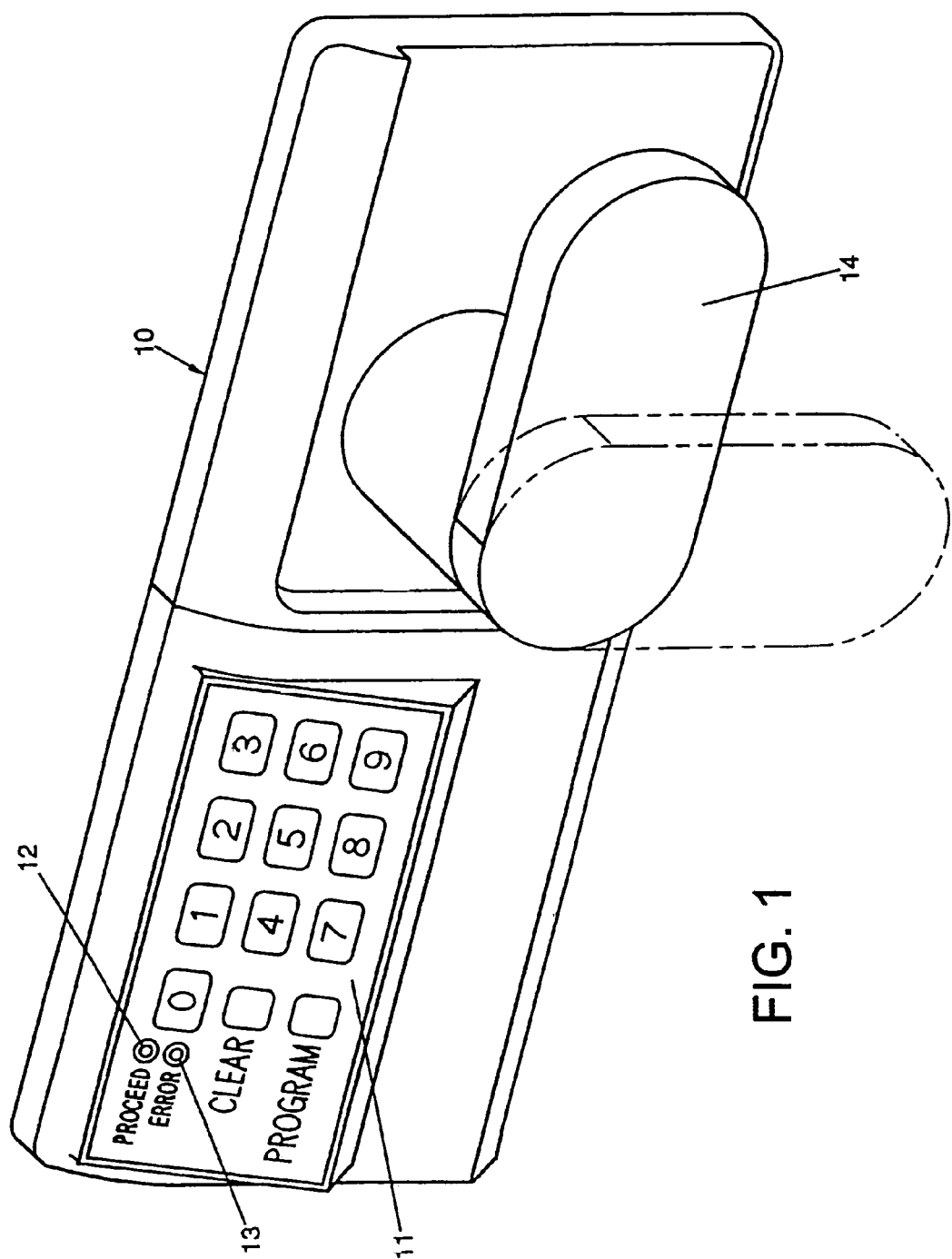
FIG. 1 is a perspective view showing an electronic access control device having a keypad.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DESCRIPTION OF THE PREFERRED EMBODIMENTS

Referring to the drawings, there is shown in FIG. 1 an illustrative electronic access control device 10 having a keypad 11, light emitting diodes (LEDs) 12 and 13, and a mechanical lever arm 14. In this illustration, the device is used as a lock for an office safe. The device can also be applied to various applications including locks for vending machines or amusement games.

Figure 2:
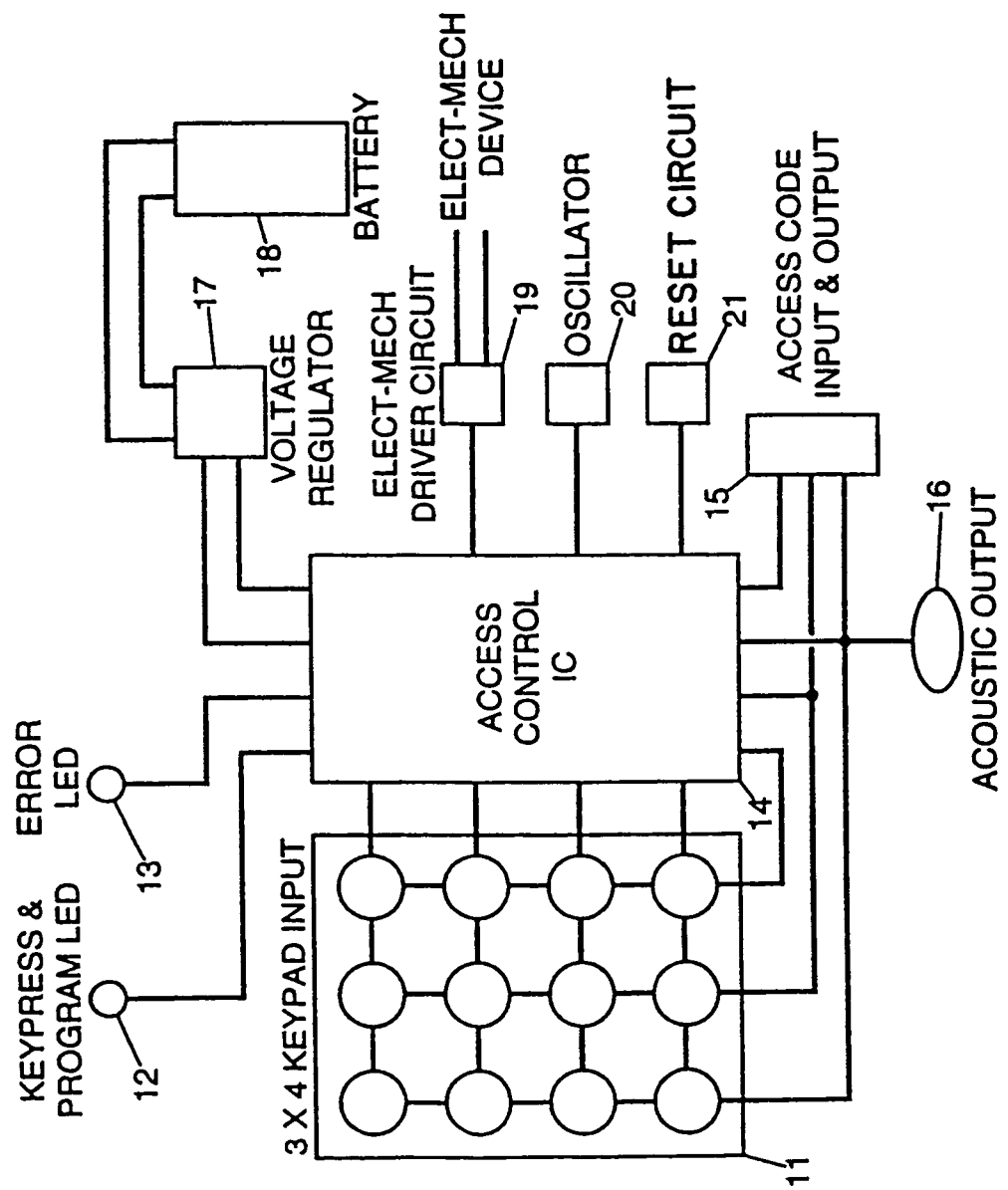
FIG. 2 is a block diagram of the electronic access control device of FIG. 1.

The main components of the electronic access code device are shown in FIG. 2 which include a keypad 11, a microprocessor 14, an access code input and output 15, an acoustic output (a piezo ceramic bender, Model No. KB1-1541) 16, LEDs 12 and 13, a voltage regulator (LM2936Z-5.0) 17, a battery 18, an electromechanical driver output 19, an oscillator 20, and a reset circuit 21. Inputs to the device may take the form of a thumbprint scan, a retinal scan, or a magnetic strip input which may work in conjunction with a keypad or as a sole means of input. Outputs may take the form of an alphanumeric display which may work in conjunction with an acoustic output or an LED or as a sole means of output.

The manufacturers which provide microprocessors applicable to the device include: Micro-Chip (PIC 16C54, PIC 16C57, PIC 16C71, PIC 16C76); Motorola (MC68HC705J1, MC68HC705K1, MC69HC705P6, MC68HC705P8, MC68HC705P9); National Semiconductor (COP 820C); SGS-Thomson (ST 6210); Texas Instruments (370C311); Zilog (Z84C01).

Figure 3:
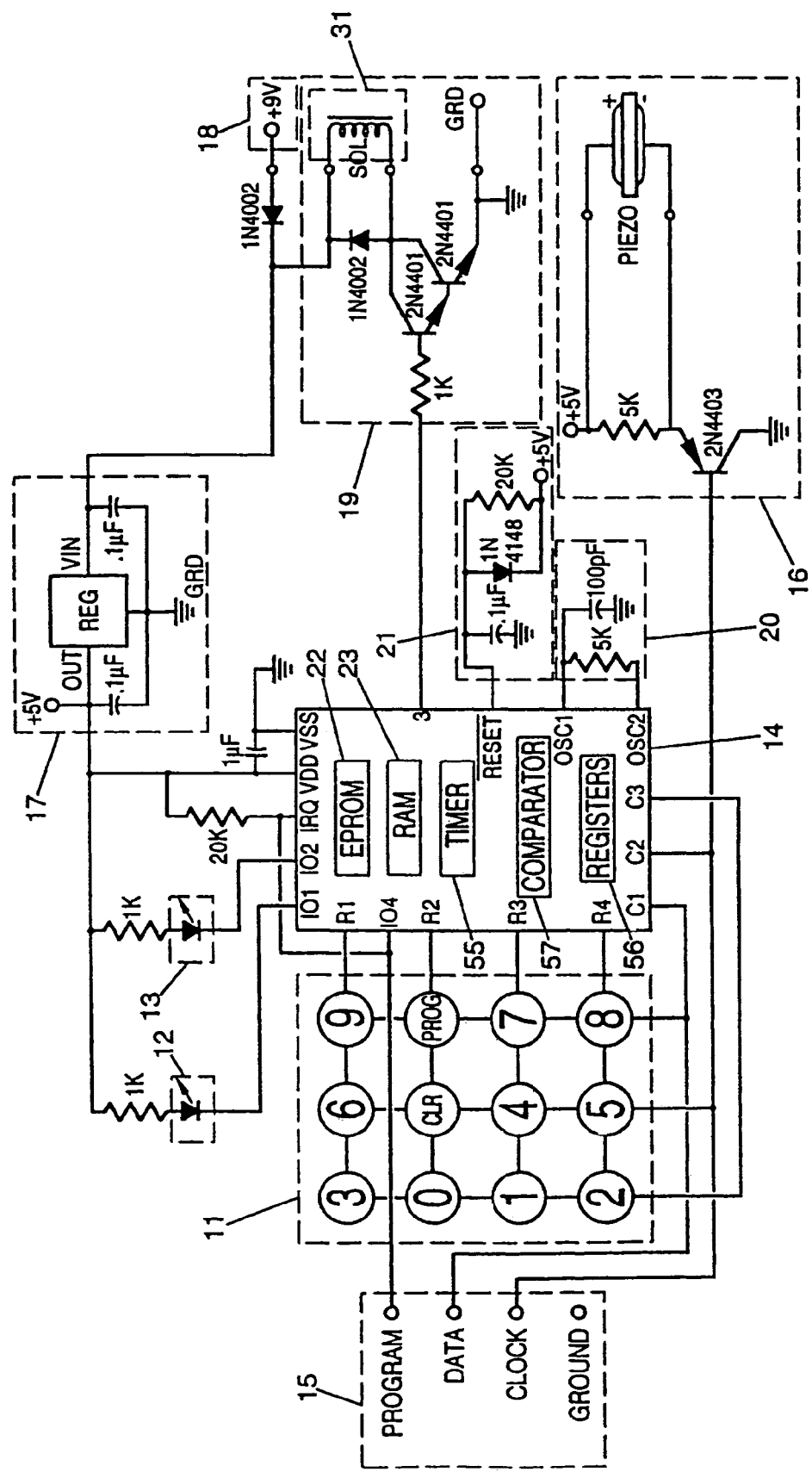
FIG. 3 is the schematic of the electronic access control device.

A more detailed schematic of the device is shown in FIG. 3, highlighting the reduced pin configuration and the serial access to the electrically programmable read only memory (EPROM) 22. Several of the pins on the microprocessor 14 are multiplexed and perform multiple functions, at times used as inputs and at times used as outputs; thereby, the pin configuration is able to use only 9 pins for the keypad input, the acoustic output, and the EPROM 22 reading and writing. For example, the 12 keypad entries are shown in rows and columns. Each keypad entry in a row is connected to the corresponding pin. For example, keypads "3", "6", and "9" are connected to pin R1. Each keypad entry in the same column is connected to a corresponding pin as well. For example, keys "3", "0", "1", and "2" are all connected to pin C3.

Figure 4:
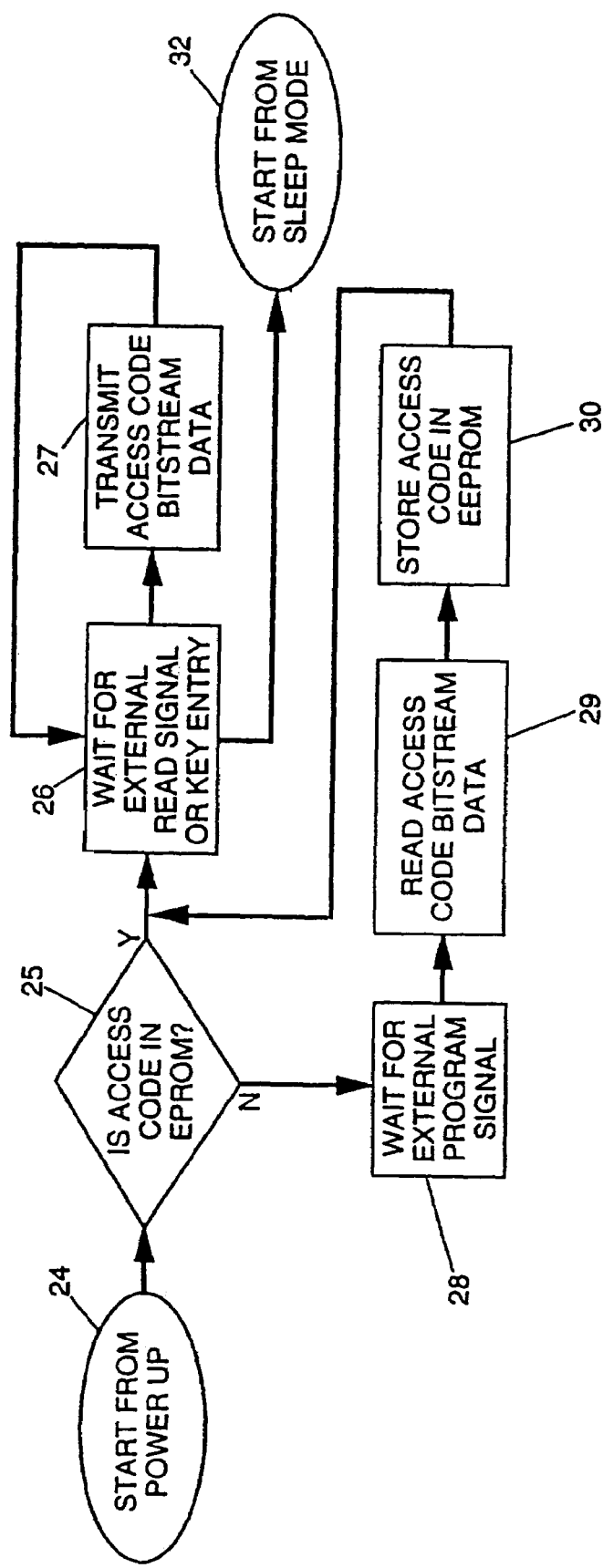
FIG. 4 is the flow chart at power-up of the device.
Figure 5:
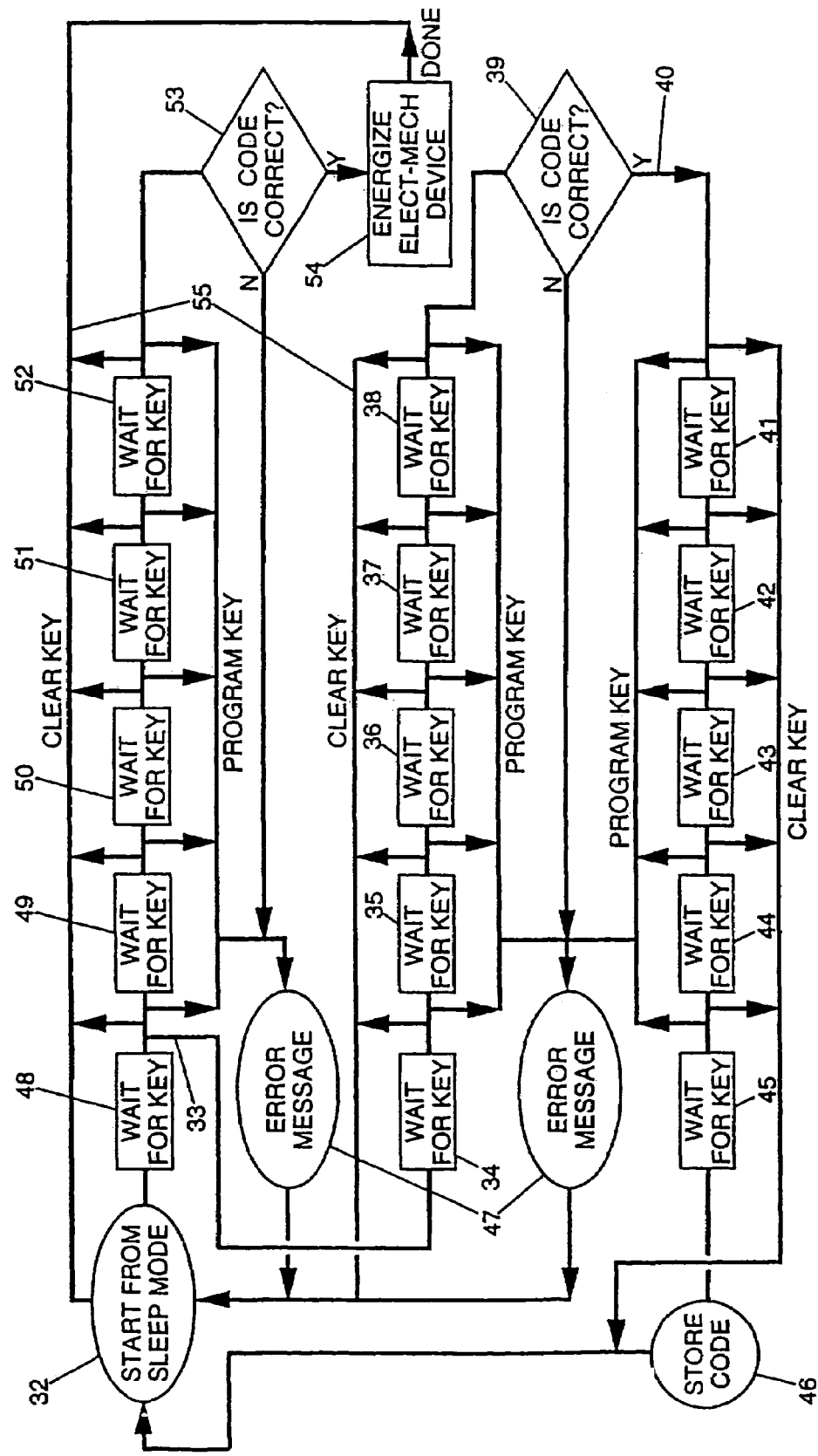
FIG. 5 is the flow chart of the device in normal operation.

The multiplexing of the keypad allows for input of twelve different inputs ("0" through "9", PROG, and CLR) using a four by three configuration, as shown in FIG. 4 and FIG. 5. In particular, there are four rows and three columns in this configuration. In accordance with another embodiment, a keypad with four different inputs allows for as little as a two by two configuration through multiplexing the inputs.

The following example will illustrate the multiplexing with respect to the keypad 11. Normally, in sleep mode, pins R1, R2, R3 and R4 are waiting for an input. When, for example, the keypad "3" is input, pin R1, which keypad "3" is connected to, is triggered signifying to the microprocessor 14 that an interrupt has occurred. The microprocessor 14 then executes an interrupt in the software program and changes one of the four pins (R1, R2, R3 and R4) into an output whereby a logic high is sent to the R1 pin. When a keypad is pressed, it acts as a short circuit; thus, when the microprocessor 14 sends out a logic high, it then senses pins C1, C2 and C3 to determine exactly which keypad in the row has been pressed. In this case, where keypad "3" is input, C3 is high. Pressing keypad "3" acts as a short circuit so that when R1 is sent high, there is a direct electrical connection between pin R1 and C3 via keypad "3"1. Thus, the microprocessor 14 can determine that keypad "3" was pressed based on R1 and C3 both being logic high.

Another example of using multiple functions as connected to a single pin is the acoustic output 16. The acoustic output 16 is connected, via a transistor, to pin C2. Pin C2 is also connected to keypads "CLR", "4", "5", and "6". When the microprocessor 14 sends an audible signal output, pin C2 acts as an output. When the microprocessor is sensing the keypad input, C2 acts as an input.

A further example of multiple functions as connected to a single pin is the EPROM 22 sensing function. The EPROM 22, as shown in FIG. 3, is part of the microprocessor 14. The DATA line (bidirectional in that the line is able to input data to write and output data to read) and CLOCK line of the EPROM 22 are connected to C1 and C2, respectively. Pins C1 and C2 are connected to the keypad as well. When the PROGRAM signal is input, C1 and C2 function as inputs when writing to the memory location in the EPROM and function as outputs when reading from the memory location in the EPROM 22. Through this arrangement, the manufacturer may serially program the device with the access code. The microprocessor 14 uses registers 56 to transmit the incoming serial data into parallel data for the EPROM 22 to input. Further, the end user may read the EPROM 22 access code serially as well. In reading the EPROM 22, only three pins must be accessed (PROGRAM, DATA, and GROUND). The microprocessor 14 uses registers 56 to transmit the outgoing parallel data from the EPROM 22 to serial form for output.

It will be appreciated that by installing a communication port, namely the access code I/O 15, in the microprocessor-based control circuit, the manufacturer of the device can access the EPROM by interacting with the microprocessor 14 via the communication port. By virtue of this arrangement, the manufacturer can program the access code into the EPROM as the last step in the manufacturing process, i.e., after the control circuit has been fully assembled. Thus, there is no longer the need to use a EPROM that is pre-programmed with access codes, or to attempt to input the access code into the EPROM by means of pin clips or the like during the manufacturing process. This ability to program the EPROM after the completion of the control circuit imparts significant flexibility, efficiency, and reliability to the manufacturing process.

The operation of the electronic access code device is shown in flowchart form in FIG. 4 and FIG. 5. FIG. 4 shows the initialization sequence of the device upon power-up 24. The microprocessor, which contains an EPROM 22 and a random access memory (RAM) 23, checks to see if there is an access code stored 25 in the EPROM 22. The microprocessor 14 performs this operation by checking if a proprietary bit sequence is set, wherein the particular sequence of bits signifies that the EPROM 22 has a stored access code. If the bit sequence is present, the EPROM 22 contains the access code, whereby the microprocessor 14 waits for input from the keypad or waits for an external read signal 26 from the microprocessor 14.

If the bit sequence is not present, the EPROM 22 does not contain the access code in its memory. The microprocessor 14 must then wait for the external program signal 28 which signifies that the access code is being written to the EPROM 22. The external program signal, as shown in FIG. 3, is labeled PROGRAM and is connected to pin 104 and pin IRQ of the microprocessor 14. In this mode, when the PROGRAM signal is toggled, this signifies that the access code is being burned into the EPROM 22. The microprocessor 14 then uses the CLOCK and DATA lines to clock in the data thereby reading the access code. Then, the microprocessor 14 stores the access code into memory 30. The microprocessor 14 subsequently sets the proprietary bit sequence on the EPROM 22 signifying that the EPROM 22 contains the access code. Finally, the microprocessor 14 waits for input from the keypad or waits for an external read signal 26 from the microprocessor 14.

The EPROM 22 can also be used to store features other than the access code. It can be used to determine such things as: (1) the amount of time the solenoid 31 is to be energized upon opening the lock; (2) the number of key presses in the access code; (3) the option of disabling the permanent access code temporarily when a new-access code is stored in RAM 23; (4) the device serial number; and (5) the date and time the device was manufactured or put in service. These features allow the manufacturer to deliver to an original equipment manufacturer (OEM) customer a generic electronic lock assembly. The OEM customer may then characterize all the specific lock features at the OEM customer facility.

As shown in FIG. 5, after the power-up initialization routine, the microprocessor waits for an entry from the keypad 32. Several functions are available based on the keypad entry. If the program key (PROG key) is first pressed, the operator wishes to input an additional access code 33. In this mode, the microprocessor 14 inputs the next five numbers from the keypad 34, 35, 36, 37, and 38. The comparator 57, within the microprocessor 14, compares the two numbers and checks if the input number matches the access code 39 from the EPROM 22 which is stored in RAM 23. If the two numbers match, this signifies that the operator knows the access code in the EPROM 22 and therefore has clearance to input an additional access code 40. Thus, the microprocessor accepts the next five numbers from the keypad as the additional access code 41, 42, 43, 44, and 45, and stores the new access code 46 in RAM 23. The operator may then input either the access code from the EPROM 22 or the additional access code to open the lock. The operator may repeat this procedure and place additional access codes into RAM 23. The additional access codes will be stored in RAM 23 until the power is removed from the microprocessor 14 at which time the RAM 23 memory will be lost.

An alternate mode of using the PROG key is to disable the permanent access code in the EPROM 22 temporarily when a new access code is entered into RAM 23. After the PROG key is hit, the microprocessor 14 inputs the next five numbers 34, 35, 36, 37 and 38. The comparator 57, within the microprocessor 14, compares the input number with the permanent access code 39 from EPROM 22. If the two numbers match, the microprocessor 14 inputs a second access code 41, 42, 43, 44, 45. In this alternative, when the microprocessor 14 stores in RAM 23 the new access code 46, it disables access to the permanent access code in RAM 23. Therefore, until the battery 18 is turned off, the only access code available is the new access code stored in RAM 23.

If an operator enters the PROG key at any time other than at the first keypad entry from sleep mode, the microprocessor will display the error message 47 by sounding the acoustic output 16 through pin C2 and the LED 13.

If a number from the keypad 11 is first entered while in sleep mode 48, the microprocessor 14 waits until another four numbers are entered 49, 50, 51, and 52, from the keypad 11. The microprocessor 14 then compares the number entered from the keypad 11 with the access code 53 stored in RAM 23. If the numbers match, the microprocessor 14 energizes the solenoid 31 at the output 54. The microprocessor 14 can also energize a DC motor, an electro-mechanical relay, or a solid-state relay. If the numbers do not match, the error message is sent 47 by sounding the acoustic output at pin C2.

If the clear key on the keypad is entered at any time in the operation of the device, the microprocessor 14 waits 5 seconds before going back into sleep mode and waiting for the next keypad entry.

One feature of the device is a lockout of keypad operations. If the microprocessor 14 receives three consecutive operations which generate error messages 47, the microprocessor 14 will disable operation of the device for two minutes. Any attempt to operate the device in the two minute lockout period will generate an error message 47.

An additional feature of the system is a requirement that a digit must be entered within a specified time. Otherwise, the microprocessor 14 will send an error message 47 if there is a five second lapse between keypad entries.

A further feature of the system is the modulated voltage across the solenoid 31. When the correct access code is input 53 from the keypad 11, the microprocessor 14 energizes the solenoid 31. The microprocessor 14 must supply sufficient power to the solenoid to unlock the lock (i.e., the solenoid must push the plunger in against the coil to open the lock). This involves two different operations. First, the solenoid 31 must physically push the plunger against the coil. Second, the solenoid 31 must keep the plunger pushed against the coil for the specified time in which to keep the lock unlocked.

The first operation (pushing the plunger) is very energy intensive. The solenoid 31 must exert kinetic and potential energy to physically move the plunger against the coil. The second operation (maintaining the position of the plunger) is less energy intensive. The solenoid 31 must exert only potential energy in terms of keeping the plunger compressed against the coil. The device, in order to unlock the lock, supplies the entire battery power necessary for the solenoid 31 to pull the plunger in against the coil. The microprocessor 14 accesses the timer 55, within the microprocessor 14, whereby the timer indicates when to reduce the power. Once the plunger is pulled in, the microprocessor 14 modulates the voltage to the solenoid 31. This reduces the current into the solenoid while the solenoid plunger is held in since the entire DC current is not required to keep the plunger in the closed position-relative to the coil. This in turn reduces the total amp-hours of current out of the battery during an access cycle, and the total number of accesses to the device increases.

By way of example, the solenoid 31 requires 300 milliamps of current to pull the plunger in. The microprocessor 14 accesses the timer 55, waiting 0.5 seconds to do that operation. The microprocessor 14 then drops the solenoid current to 150 milliamps. This current is sufficient for the solenoid 31 to keep the plunger flush against the coil. The microprocessor 14 accesses the timer 55 again, waiting for the timer 55 to indicate that three seconds have passed, supplying the lower current to allow the user to open the door. In this manner, the microprocessor 14 uses approximately ½ as much power in the modulated mode.

Figure 6:
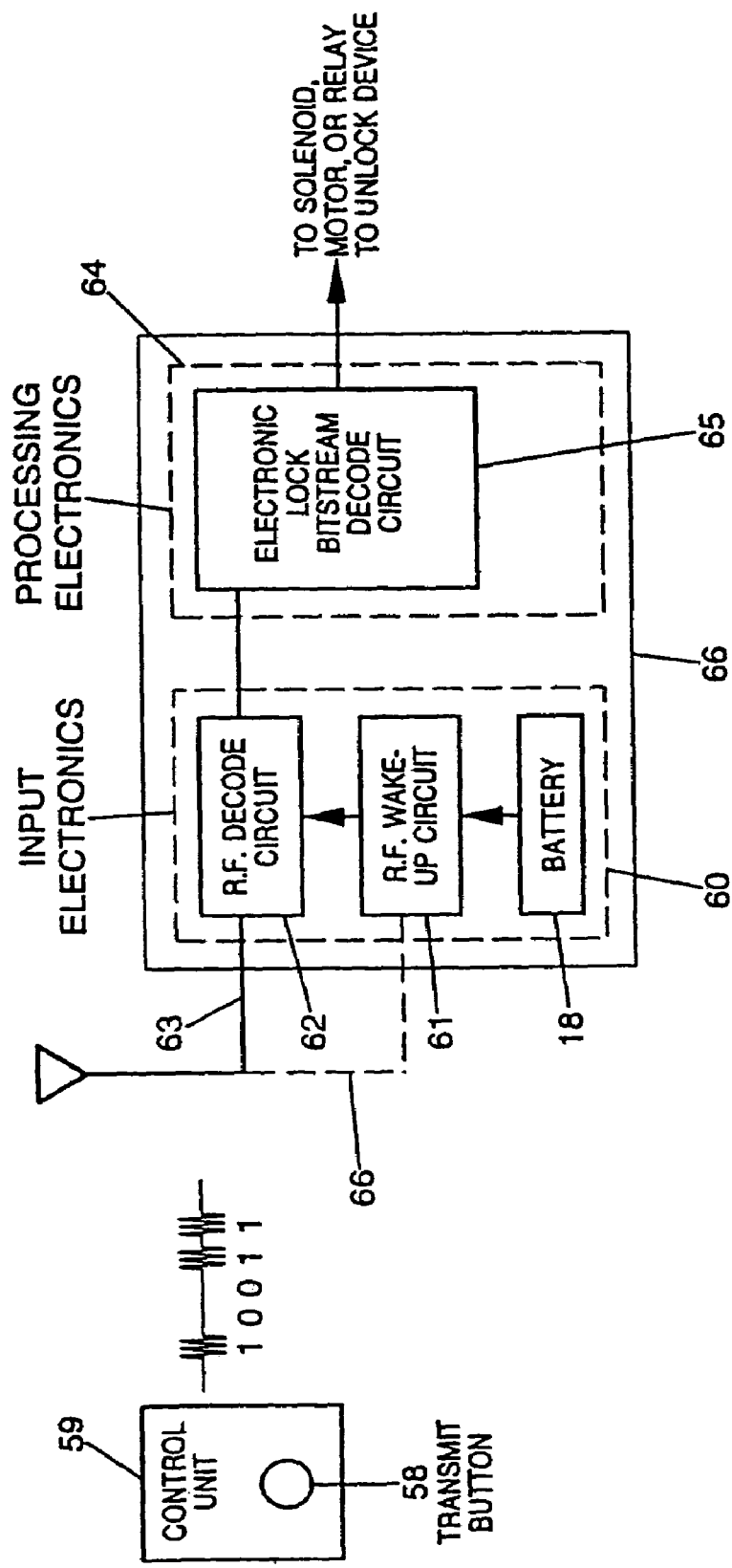
FIG. 6 is a block diagram of a remote access control device.

FIG. 6 highlights another aspect of the invention, the remote operation of the electronic access code device using a battery. The device can be integrated with other electronic devices forming a system of electronic locks. At the center of the system is a central control station whereby each of the devices may be accessed.

The accessed device is designed for low power consumption so that it may operate on a battery for an extended period of time. The remote access device is normally in a sleep mode. In other words, the device is not in active operation. The remote device can "wake-up" from the low power sleep mode in a variety of ways. One method is for the circuitry in the sleep mode device to sense the incoming signal. When the signal is sent, the remote device resumes normal operation. Another method is for the circuitry in the sleep mode device periodically to resume normal operation and sense if there is an incoming signal. If the incoming signal is sent, the circuitry is able to receive the bitstream data that contains the access code. The circuitry thus remains in a low-power sleep-mode condition for the majority of the time, dissipating low power, while no signal is received. The device may then be powered by a battery.

The remote electronic access code device is divided into two parts: the input electronics 60 and the processing electronics 64. The processing electronics 64 contains a microprocessor, an access code input and output, an acoustic output, light emitting diodes (LED), a voltage regulator, and an electromechanical driver output. Thus, the remote device is similar to the microprocessor in processing the input access code, as shown in FIG. 1, except the access code may be input in several ways. In this embodiment, the data stream is input serially into the microprocessor 14 so that a variety of serial inputs may be connected to the input of the microprocessor 14. For example, the access code may be input using a traditional keypad 11 transmitting data in serial mode. Moreover, the data may be input serially using an electromagnetic signal input from the radio frequency (RF), optical frequency or infrared frequency bands. Thus, the microprocessor 14, in this configuration, may accept the input from any one of this inputs.

The input electronics 60 accepts the code sent from the central control. The method of transmitting the code may take several forms including an electromagnetic signal (such as a RF signal sent by an RF serial bitstream transmitter, or an infrared signal) or a data line (telephone line).

When an RF signal is used, the central station transmits a signal via a transmit antenna 63 (transducer that sends radiated electromagnetic fields into space). The radiated waves containing the RF signal contains the bitstream access code which is sent to the input electronics 60. The input electronics 60 contains the RF wake-up 61 and the RF decode circuitry 62. In one embodiment, the RF wake-up circuit 61 is ordinarily in a low power sleep-mode. However, for a 10 millisecond period every 1 second, the RF wake-up circuit 61 senses for an RF bitstream signal. If an RF bitstream signal exists, it remains awake and receives the entire RF bitstream signal. The RF wake-up circuit 61 then sends a wake-up enable signal to the RF decode circuit 62. The RF decode circuit 62, via the antenna 63, translates it into a series of bits and then sends the digital bitstream signal to the processing electronics 65 to determine if the digital bitstream signal contains the access code.

In another embodiment, the RF wake-up circuit 61 remains in low power sleep mode until it senses the RF signal. The RF signal, in this embodiment, contains a low carrier frequency way and a high frequency RE bitstream superimposed on the low frequency carrier wave. When the RF wake-up circuit 61 senses, via the antenna 66, that there is a signal tuned to the low frequency carrier wave, the RE wake-up circuit 61 sends a wake-up enable signal to the RF decode circuit 62. The RF decode circuit 62 then accepts the RF bitstream access code signal, and translates it into a series of bits for the microprocessor 14.

Figure 7:
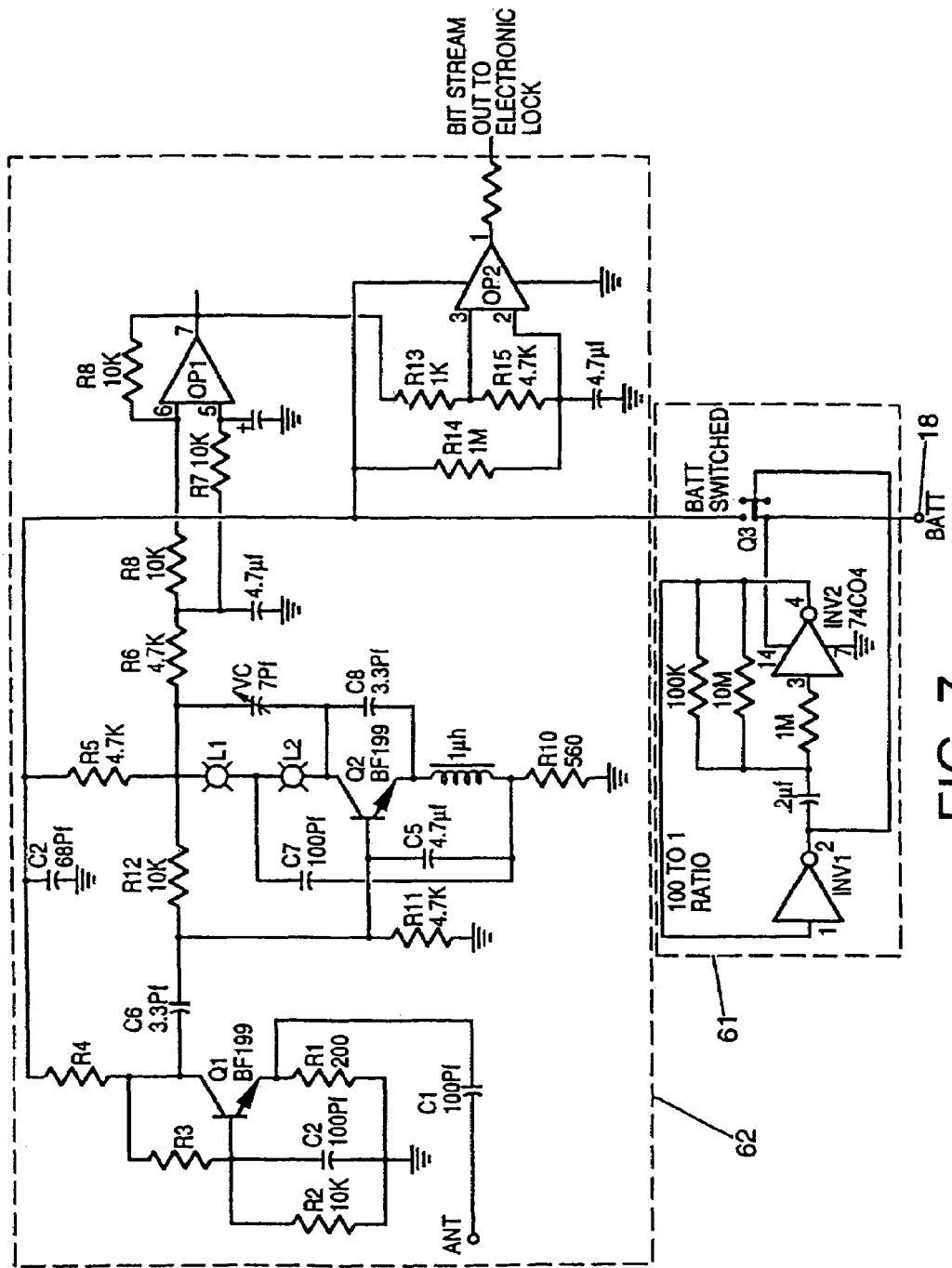
FIG. 7 is a schematic of the input electronics of the remote access control device of FIG. 6.

FIG. 7 shows the schematic of the input electronics 60 wherein the RF wake-up circuit 61 periodically wakes up from a low power sleep mode and senses if there is an incoming RF signal. The RF wake-up circuit 61 consists of two low-power CMOS inverter gates, INV1 and INV2, a CMOS transistor Q3, resistors, and a capacitor. The two inverters INV1 and INV2 are configured in an oscillator configuration in a ratio of 1 to 100. In other words, the oscillator will switch on for $\frac{1}{100}$ of a second. At this time, the CMOS transistor Q3 will turn on and supply the battery power to the RF decode circuitry 62. The RF decode circuitry 62 will only draw battery power for $\frac{1}{100}$ of the time, and thus the battery will last 100 times longer than if the battery were permanently connected to the RF decode circuitry 62.

The RF decode circuitry 62 consists of two bipolar junction transistors Q1, Q2, two Operational Amplifiers, OP1 and OP2, and resistors, capacitors, inductors and diodes connected to these components. The RF input signal is referred to as an on-off keying of high frequency bursts for set time frames. In the present invention, the frequency is set at 320 MHz. A burst of frequency is detected by the Q1 and Q2 transistors with their circuits tuned to the correct frequency (320 MHz in this example). The RF decode circuitry 62 then senses the data bitstream sent in the form of digital 1 data signal and digital 0 dead band of no frequency. Thus, a train of on and off frequency pulses would be received by the antenna, conditioned and amplified by Q1 and Q2 of the RF decode circuitry 62, and converted to bitstream 1 and 0 digital signals by the two operational amplifier signal conditioners OP1 and OP2.

Typically, the operator of the control unit 59 which contains the RF transmitter will enable the RF transmitter with a transmit button 58 to send an RF on-off keying pulse for approximately one second. The RF signal being transmitted is a digital bitstream conditioned to an RF on-off keying signal which takes about two milliseconds in which to transmit one complete signal. The control unit 59 then repeats the signal over and over for the duration that the RF transmitter is enabled. In order for the receiver to detect one complete bitstream from the transmitter, the RF signal only needs to be sampled for two milliseconds during which the transmitter is enabled and transmitting. If the RF transmitter is enabled for one second, the transmitted bitstream signal takes $\frac{1}{500}$ of a second to be transmitted and is repeated 500 times over the entire one second. The receiver is enabled for $\frac{1}{100}$ of a second every second, and will have the opportunity to sample and detect a signal that is $\frac{1}{500}$ of a second in duration, transmitted 500 times over one second. After the $\frac{1}{100}$ of a second, the oscillator, formed by INV1 and INV2, will switch Q3 off, and the battery power to the RF decode circuitry will be shut off. Only the oscillator circuit (INV1 and INV2) will dissipate battery power at a small rate of less than 100 micro-amps.

If less power dissipation by the RF decode circuitry 62 is required, the decode circuitry power duty cycle can be reduced by increasing the oscillator frequency to more than 100 to 1 and thus decreasing the RF decode circuitry 62 sample rate. In order to ensure the RF decode circuitry 62 will be enabled long enough to detect the entire transmitter digital bitstream, the lock CPU would wait for the beginning of the bitstream signal which is received by the RF decode circuitry 62 when the circuitry was enabled and conditioned through OP1, and then would send an output enable signal back to Q3 to override the oscillator and keep the RF decode circuitry 62 enabled with battery power until the lock CPU has received the correct amount of bitstream data from the transmitter through the decode circuitry. Thereafter, the lock CPU would disable the Q3 transistor and the RF decode circuitry and let the oscillator go back to its low rate of sampling.

The processing electronics 64 remains in sleep-mode low current operation until a valid on-off keying frequency signal is received while the RF decode circuitry is enabled and a digital bitstream signal is sent to the lock microprocessor 65. Upon transferring the bitstream signal, the microprocessor 14, within the processing electronics, compares the input code with the access code in the comparator. If correct, the solenoid, DC motor, electro-mechanical relay, or solid-state relay is activated. After this operation, the microprocessor 14 sends a disable signal to the RF wake-up circuit to assume a low power mode.

Figure 8:
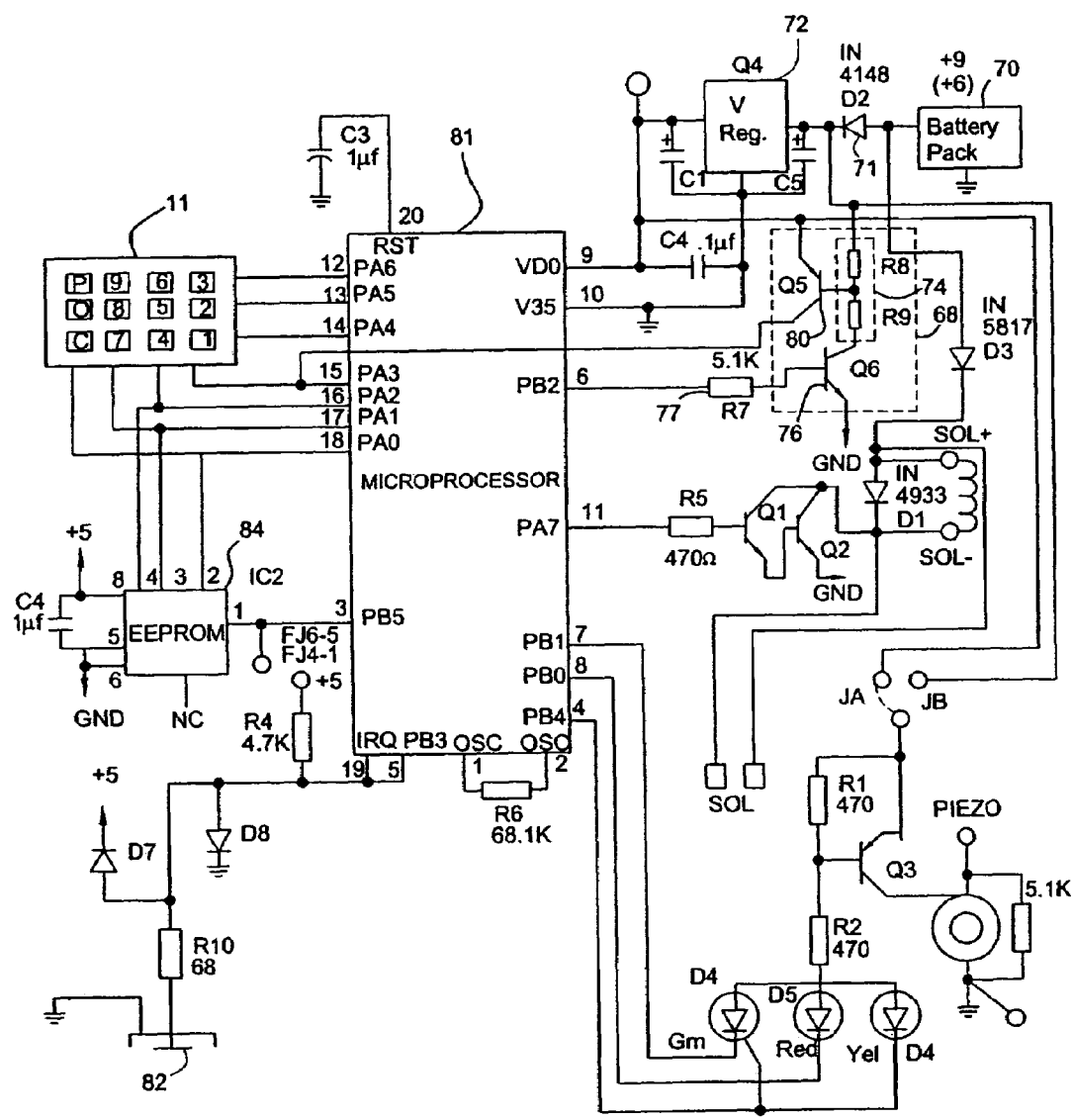
FIG. 8 is a schematic of another embodiment of the electronic control access device which has a non-volatile memory sharing certain pins of a microprocessor with a keypad.

FIG. 8 shows the schematic of another embodiment of the electronic access control device which also multiplexes the inputs and outputs of the pins of the microprocessor to reduce the number of pins required. The microprocessor 81 used in this embodiment is preferably the MC68HRC705J1A integrated circuit (IC) manufactured by Motorola. As illustrated in FIG. 8, the input devices include a keypad 11 and an electronic key reader 82.

In this embodiment, instead of using an EPROM internal of the microprocessor as in the case of the embodiment of FIG. 3, an EEPROM 84 external of the microprocessor 81 is used to store the programmed access code as well as other useful information. The EEPROM 84 used in this embodiment is preferably the 93LC46 IC manufactured by Microchip. Alternatively, a FLASH read-write memory, or any other type of suitable memory, may be used. To effectively use the limited number of pins of the microprocessor 81, the pins are multiplexed such that the keypad 11 and the EEPROM 84 share several communication pins. As illustrated in FIG. 8, pins 16 (PA2), 17(PA1), 18 (PA0) of the microprocessor 81 are connected to pins 4, 3, and 2 of the EEPROM 84, respectively. These pins of the microprocessor 81 are also connected to the keypad 11 for receiving access codes entered by means of the keypad. Pin 3 (PB5) of the microprocessor 81 is connected to pin 1 of the EEPROM. In this configuration, pins 1-4 of the EEPROM 84 are used, respectively, for chip select, data in, data out, and clock.

In accordance with an aspect of the present invention, the microprocessor-based control circuit further includes a low-battery detection circuit 68 that does not consume electrical power except when a low-battery detection is in progress. As illustrated in FIG. 8, the access control device is powered by a battery pack 70 which includes one or more batteries. The output of battery pack is connected to a voltage regulator 72 which provides a regulated voltage for operating the control circuit. The low-voltage detection circuit 68 includes a voltage divider 74 which has its input end connected to the output of the battery pack 70 (which in the illustrated case is after an isolating diode 71). The voltage divider 74 is connected in series with a transistor 76 to ground. The base of the transistor 76 is connected (via a resister 77) to pin 6 (PB2) of the microprocessor 81. When Pin 6 of the microprocessor 81 is set high, the transistor 76 is turned on, thereby allowing current to flow through the voltage divider 74. When pin 6 is set low, the transistor 76 is turned off, and the current through the voltage divider is cut off. In that case, the output voltage of the voltage divider 74 will be pulled up to that of the battery voltage minus the voltage drop across the diode 71.

The output end of voltage divider 74 is connected to the base of a second transistor 80. The input end of the transistor 80 is connected to the output of the voltage regulator 72, while the output end of the transistor 80 is connected to pin 15 (PA3) of the microprocessor 81. Normally pin 6 of the microprocessor would stay low, and both the transistor 76 and the transistor 80 would be turned off. When a battery voltage test is performed, pin 6 is switched to the high ("1") state to turn on the transistor 76, and the state of pin 15 is sensed by the microprocessor 81 to determine the on/off state of the transistor 80. If the battery voltage is sufficiently high, the output of the voltage divider 74 would be high enough to turn the transistor 80 off. On the other hand, if the battery voltage is low, the output of the voltage divider would be low enough to turn the transistor 80 on, and pin 15 would be switched to the high state.

Figure 9:
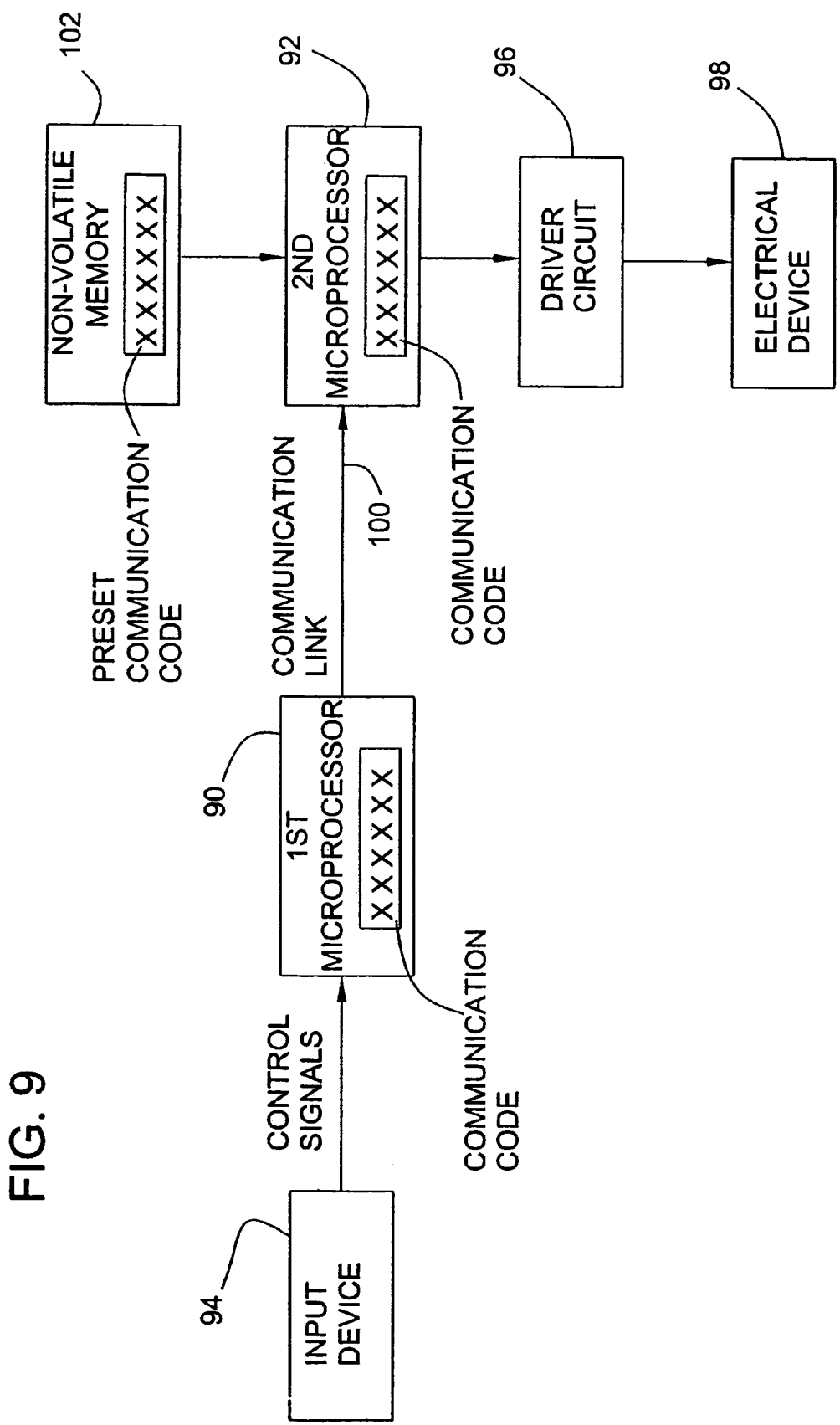
FIG. 9 is a functional block diagram showing an embodiment of an electronic access control device having two microprocessors communicating with each other to provide enhanced security of the device.

In accordance with an important aspect of the present invention, there is provided an electronic access control device that provides substantially enhanced security and reduced vulnerability to tampering by using two microprocessors. FIG. 9 shows generally the functional block diagram of such a device. As illustrated in FIG. 9, the control device has a first microprocessor 90 and a second microprocessor 92. The first microprocessor 90 is connected to an input device 94 for receiving a user-entered control signal signifying a demand to operate an electronic device 98. The second microprocessor 92 controls a driver circuit 96 for energizing the electrical device 98 to effect a desired operation. The electrical device 98 may be, for example, a solenoid, motor, relay, or the like for opening a lock, or, as will be described in greater detail below, the ignition relay of a motorcycle. The first microprocessor 90 may be positioned close to the input device 94, while the second microprocessor 92 may be located close to the electrical device 98 and is preferably well shielded from external access. The two microprocessors are connected by a two-way communication link 100.

As will be described in greater detail below, the user-entered control signal may be, for example, an access code entered using a keypad or electronic key, the operation of an electronic ignition switch controlled by a mechanical lock, or a voice command entered through a voice sensor such as a microphone. Once a user-entered control signal is received, the first microprocessor 90 determines whether the demand to operate the electrical device 98 should be transmitted to the second microprocessor 92. If the demand is to be transmitted, the first microprocessor 90 sends a special communication code to the second microprocessor 92 via the communication link 100. The second microprocessor 92 compares the transmitted communication code with a preset communication code stored in a non-volatile memory 102. If the transmitted code matches the stored code, the second microprocessor 92 activates the driver circuit 96 to energize the electrical device 98.

It will be appreciated that this dual-microprocessor configuration significantly reduces the vulnerability of the device to tampering. Even if a tamperer may gain access to the first microprocessor, it is intended that the second microprocessor is well shielded and therefore cannot be reached easily. Since the second microprocessor responses only to a correct communication code, the tamperer will not be able to use the trick of "hot-wiring" to activate the driver circuit 96.

Moreover, even if the circuit containing the first microprocessor is somehow replaced by another similar microprocessor circuit for which the correct control signal is already known, that new microprocessor is unlikely to know the communication code specific to the second microprocessor 92. In this way, the two microprocessors function as two individual gate keepers. Even if the first microprocessor could be somehow bypassed, the second microprocessor would not activate the driver circuit without receiving the correct communication code.

The microprocessors can also be programmed to implement the "code-hopping" or "rolling-code" scheme used in some existing electronic access control devices to further improve the security of the device. In such a scheme, the preset code stored in the non-volatile memory 102 is used as a seed, and the communication codes stored in the first and second microprocessors are changed as a function of the number of code transmission according to a predefined algorithm based on the seed code. The changes of the communication codes in the two microprocessors are synchronized so that the they remain in operative relationship.

Figure 10A:
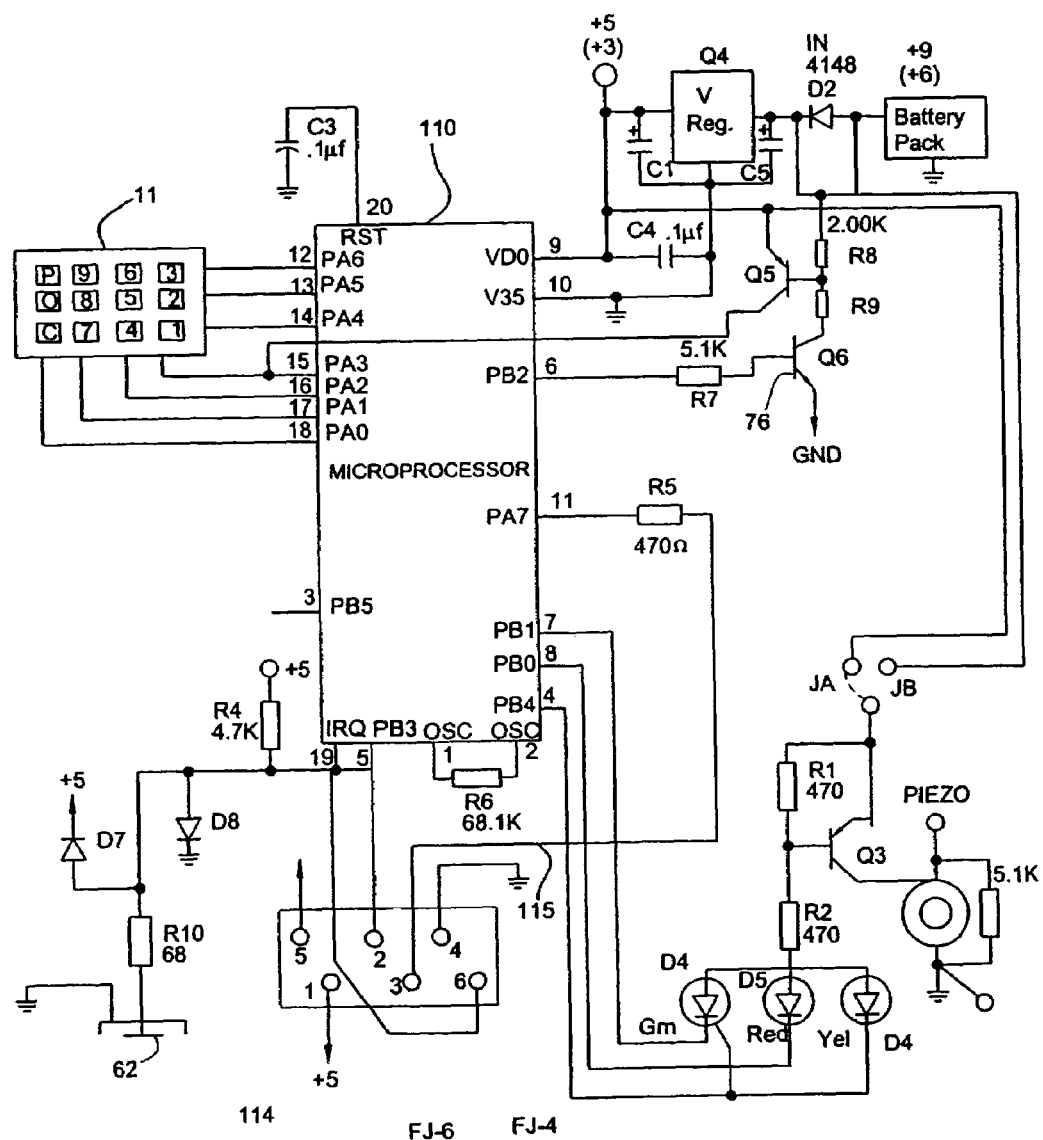
FIGS. 10A and 10B are schematic views together showing an application of the dual-microprocessor configuration of FIG. 9 in an electronic combination lock.
Figure 10B:
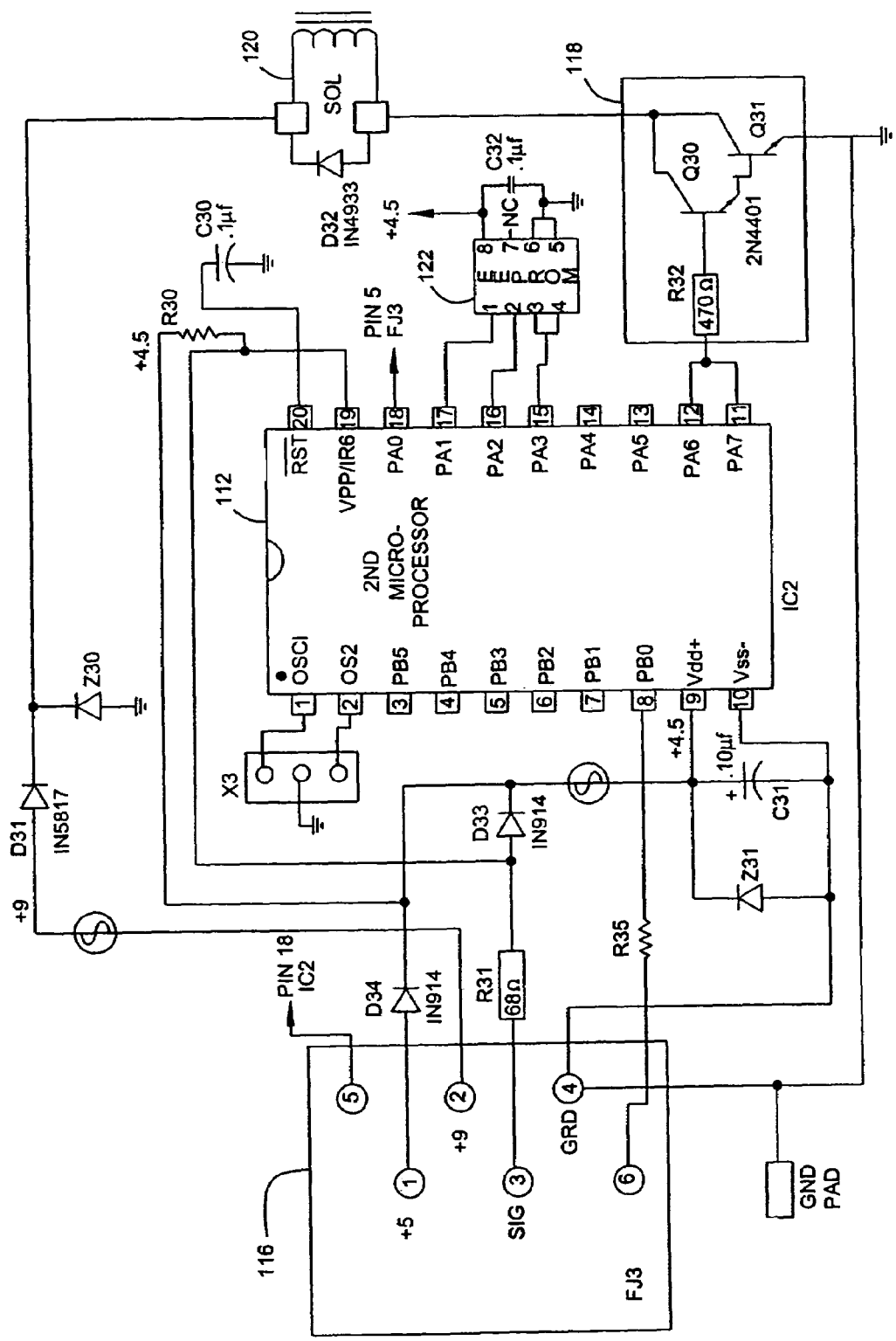

FIGS. 10A and 10B illustrate an application of the dual-microprocessor configuration in an electronic lock. In this embodiment, the control circuit has two halves connected by a cable. The first half, which is shown in FIG. 10A, contains a first microprocessor 110. The second half, shown in FIG. 10B, contains a second microprocessor 112. Pin 11 (PA7) of the first microprocessor 110 is connected to pin 18 (PA0) of the second microprocessor 112 via the cable 115 and the mating connectors 114 and 116 to establish a two-way serial communication channel between the two microprocessors.

The electronic lock has a keypad 11 and an electronic key reader 82 as input devices which are connected to the first microprocessor 110. The second microprocessor 112 controls a energizing circuit 118 for energizing a solenoid 120 to open the lock. When the first microprocessor 110 receives an access code via either the keypad 11 or the key reader 82, it compares the entered access code with an access code stored in its memory. If the entered code matches the stored access code, the first microprocessor 110 transmits a communication code to the second microprocessor 112 via the communication channel described above. The second microprocessor 112 then compares the received communication code with a preset communication code stored in an EEPROM 122. If the two communication codes match, the second microprocessor 112 activates the energizing circuit 118 to energize the solenoid 120 to open the lock.

The correct access code and communication code are preferably stored in the EEPROM 122. During initial power-up, i.e., when the battery is first attached to the electronic lock, the second microprocessor 112 transmits the access code and the communication code to the first microprocessor 110, which then stores the codes in its memory (which may be volatile) for subsequent operation.

Figure 11:
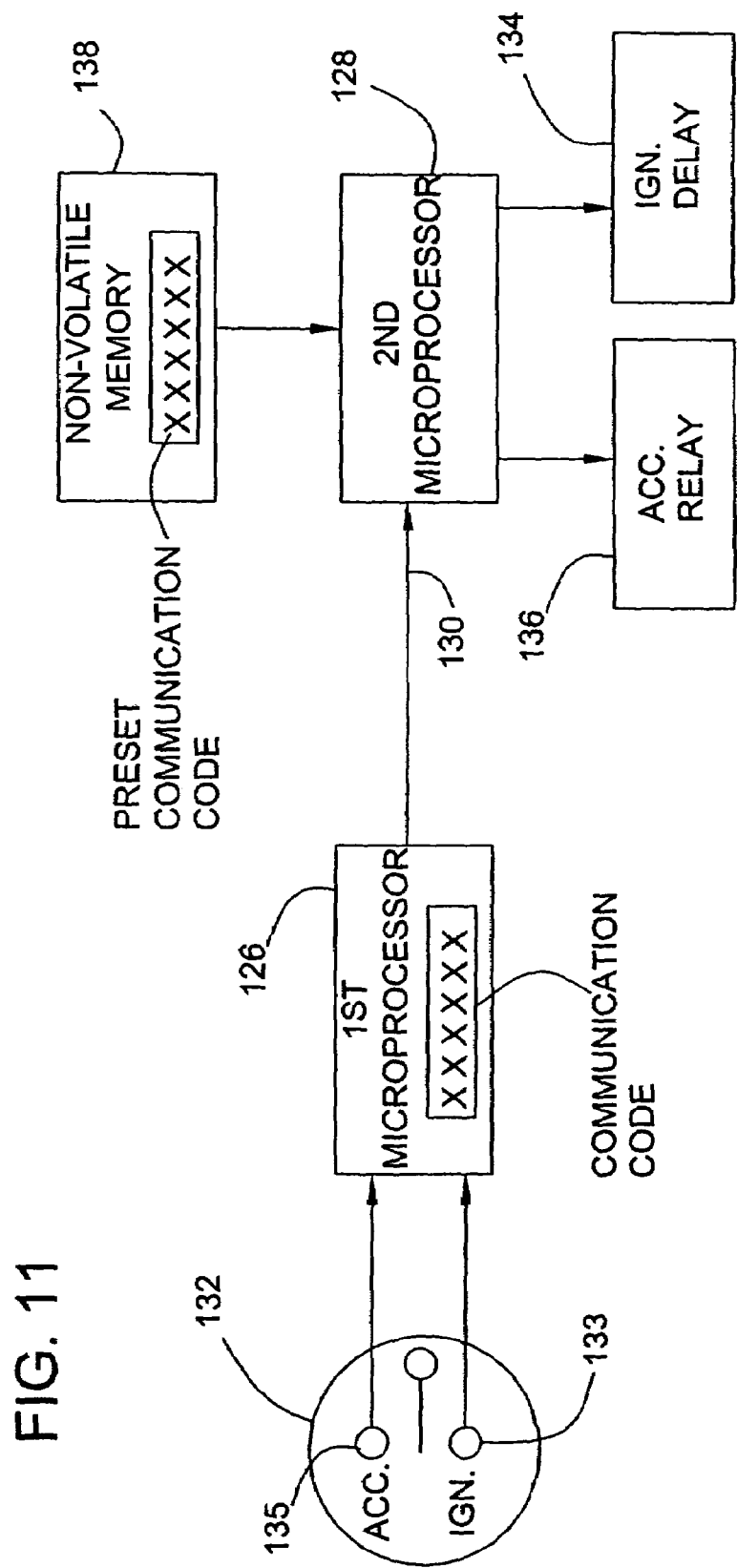
FIG. 11 is a functional block diagram showing an application of the dual-microprocessor configuration of FIG. 9 in an ignition control system for a motorcycle.

The dual-microprocessor configuration illustrated in FIG. 9 can also be advantageously used in other types of applications. For example, FIG. 11 shows an electronic ignition control system for a motorcycle. In this embodiment, the device contains a first microprocessor 126 and a second microprocessor 128 which are connected by a cable 130. A three-position ignition switch 132 is connected to the first microprocessor 126, which may be located close to the ignition switch. The second microprocessor 128 is connected to an ignition relay 134 and an accessory relay 138, and is preferably disposed close to the ignition mechanism of the motorcycle and well protected from external access.

In this arrangement, the ignition switch 132 serves as the input device, and the position of the ignition switch is used as the user-entered control signal. The first microprocessor 126 monitors the switch position. When the ignition switch 132 is turned to the "accessory" position 135, the first microprocessor 126 transmits a communication code together with a switch-position code corresponding to that switch position to the second microprocessor 128. The second microprocessor 128 compares the transmitted communication code with a preset communication code stored in a non-volatile memory 138 which has been programmed at the factory. If the two codes match, the second microprocessor 128 determines from the switch-position code that the switch is set at the accessory position and closes the accessory relay 136.

Similarly, when the ignition switch 132 is turned to the "ignition" position 133, the first microprocessor 126 transmits a communication code and a switch-position code corresponding to the ignition position to the second microprocessor 128. The second microprocessor 128 compares the transmitted communication code with the preset communication code. If the two codes match, the second microprocessor 128 determines from the switch-position code that the switch is set at the ignition position and accordingly closes the ignition relay 134 and the accessory relay 136 to start the engine.

It will be appreciated that due to this dual-microprocessor arrangement, this ignition control system cannot be "hot-wired" to start the engine of the motorcycle like conventional motorcycle ignition control systems. This system is also not susceptible to tampering by replacing the assembly of the ignition switch 132 and the first microprocessor 126 with another such assembly for which an ignition key has been obtained.

Figure 12:
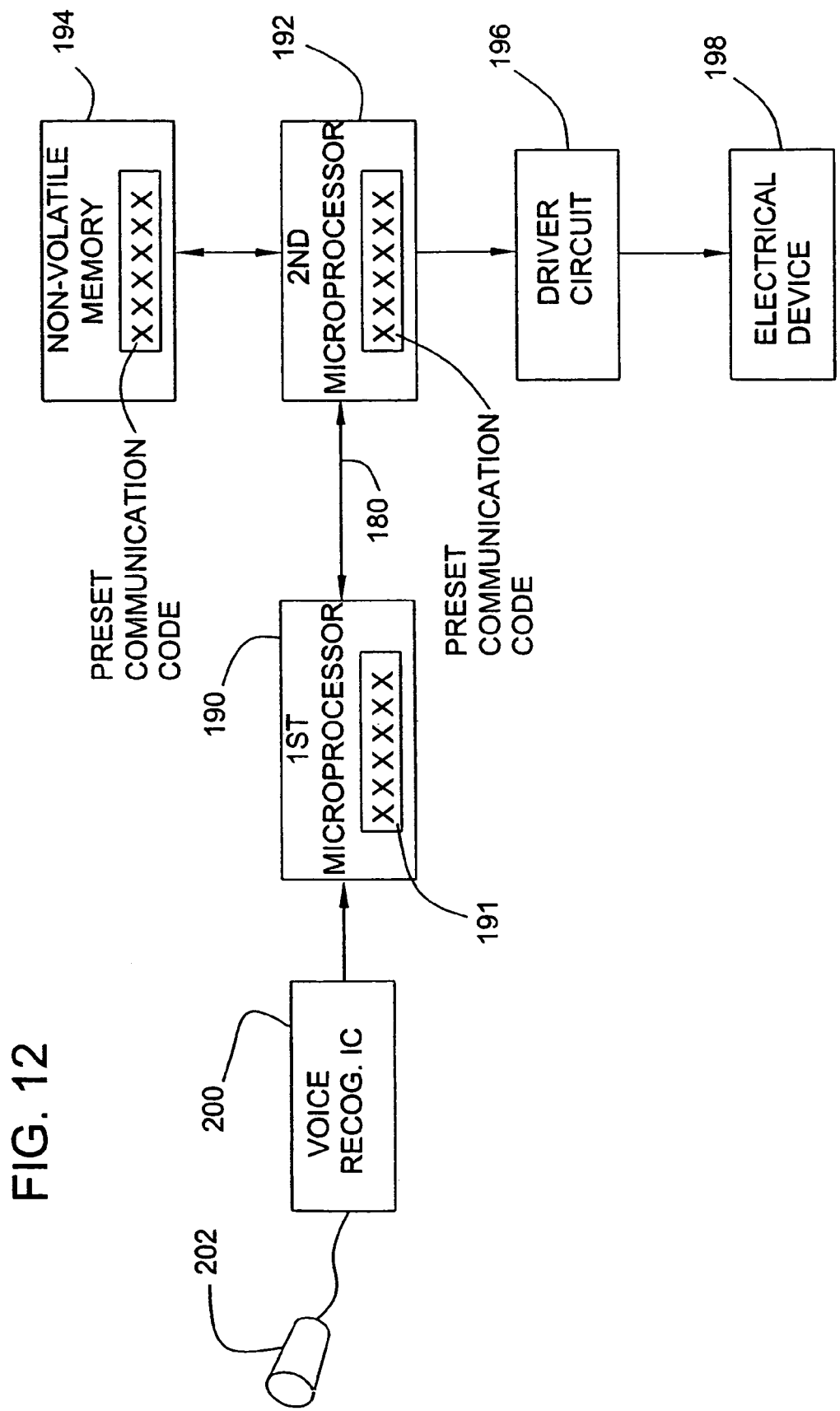
FIG. 12 is a functional block diagram showing an application of the dual-microprocessor configuration of FIG. 9 in a voice controlled access control device.
Figure 13:
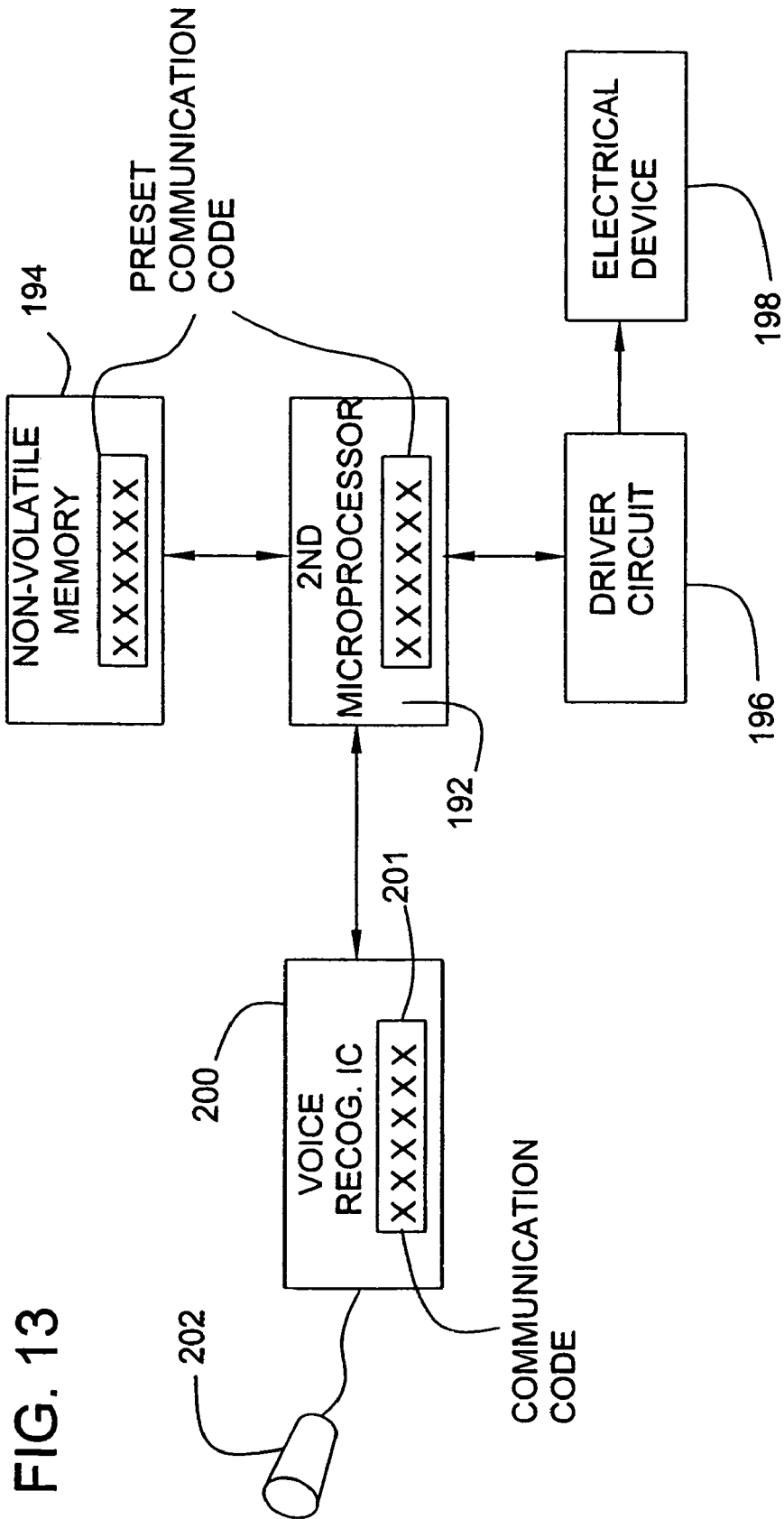
FIG. 13 is a functional block diagram showing another embodiment of the voice controlled access control device.
Figure 14:
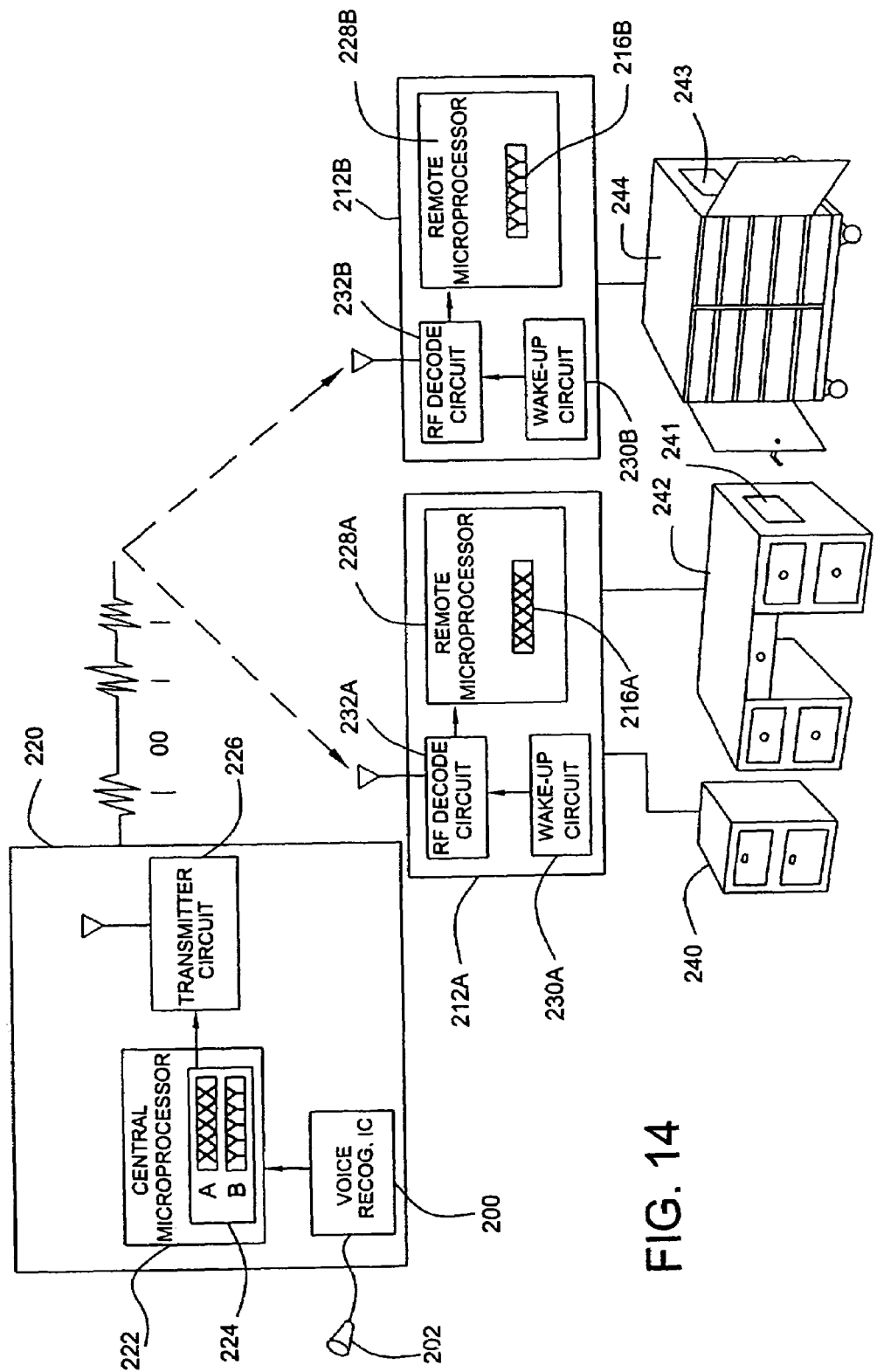
FIG. 14 is a functional block diagram showing another embodiment of the voice controlled access control device which has a central control station and remote devices.

FIGS. 12-14 show another advantageous application of the dual-microprocessor configuration of FIG. 9 which utilizes speech recognition to control the operation of an electronic access control device. As illustrated in FIG. 12, the access control device uses a speech recognition microcomputer integrated circuit (IC) 200 to process voice commands given by a user. The speech recognition IC 200 is capable of not only recognizing the commands given but also the voice of the speaker. In other words, the IC is capable of speaker dependent recognition, allowing the user to customize the words to be recognized. Such an IC may be, for example, the RSC-164 microcomputer of Sentry Circuits, Inc.

In the embodiment shown in FIG. 12, the speech recognition IC 200 has a microphone 202 connected thereto for receiving voice commands from a user. In this embodiment, the combination of the voice recognition IC 200 and the microphone 202 serves generally the function of the input device 94 of FIG. 9. An optional keypad 11 may also be used for entering an access code. After receiving a voice command, the speech recognition IC 200 analyzes the voice command to recognize the command and the voice pattern of the speaker. If the voice recognition IC 200 recognizes the voice pattern to be that of an authorized user, it transmits a command code corresponding to the command received to the first microprocessor 190. The first microprocessor 190 transmits an operation code corresponding to the command and a communication code stored in its memory to the second microprocessor 192 via a bidirectional communication link 180. The second microprocessor 192 compares the transmitted communication code with a preset communication code which is stored in a non-volatile memory 194. If the two communication codes match, the second microprocessor 192 activates the driver circuit 196 to energize an electrical device 198 to carry out the operation specified by the operation code.

FIG. 13 shows another embodiment of the voice controlled access control device. In this embodiment, the voice recognition IC 200, which is a microcomputer in itself, is used to serve the function of the first microprocessor 190 of FIG. 12. Upon receiving a voice command through the microphone 202, the voice recognition IC 200 recognizes the command and analyzes the voice pattern of the speaker. If the voice recognition IC 200 determines that the speaker is an authorized user, it transmits an operation code and a communication code stored in its memory 201 to the second microprocessor 192. If the transmitted communication code matches a preset communication code, the second microprocessor 192 executes the command by activating the driver circuit 196.

FIG. 14 shows another embodiment of the voice operated access control device which includes a central control station 220 and one or more remote devices in the arrangement shown generally in FIG. 6. The central control station 220 may be formed as a hand-held remote control unit which can be conveniently carried and handled by the user. For illustration purposes, two remote devices 212A, 212B are shown, each of which has its own unique identification code. The identification codes are stored in the memories 216A, 216B of the microprocessors 228A, 228B of the respective remote devices. The central control station 220 has a voice recognition IC 200 coupled to a microphone 202 for receiving and recognizing a voice command. If the voice pattern of the speaker matches a voice pattern stored in the voice recognition IC 200, the voice recognition IC transmits a command code corresponding to the given command to a central microprocessor 222. The command code may contain a code to indicate which remote device is to be contacted. Alternatively, the determination of which remote device is to be contacted may be made by the central microprocessor according to the command code provided by the voice recognition IC 200.

The central microprocessor-contains a memory 224 which has the identification codes for the remote devices stored therein. After receiving the command code, the central microprocessor 222 sends out through the transmitter circuit 226 a bitstream signal which contains the identification code of the remote device to be addressed and an operation code indicating the operation to be performed. In the preferred embodiment, the bitstream signal is transmitted at a radio frequency (RF). Other suitable transmission bands may also be used.

The remote devices 212A, 212B preferably are normally in the sleep mode and can wake up in the ways described in conjunction with FIG. 6. In the illustrated embodiment, each remote device has a wake-up circuit 230A, 230B and a radio frequency decode circuit 232A, 232B. After receiving the bitstream signal from the central control station 220, the radio frequency decode circuit of each remote device converts the received RF signal into a computer-compatible binary code which includes the identification code and the operation code. Each remote device then compares the received identification code with its own identification code. If the codes match, the remote device carries out the specified operation.

This voice-activated remote access control system finds many applications in different settings. For example, as illustrated in FIG. 14, the remote access control device 212A is connected to a file cabinet 240 and a desk 242 in an office for locking and unlocking the cabinet drawers and desk drawers. By way of example, when the user gives the voice command "lock desk," the central control station 220 receives the command through the microphone 202. If the speaker's voice is recognized, the central control station 220 sends out a bitstream signal to cause the remote unit 212A to operate a lock mechanism 241 in the desk 240 to lock the desk drawers. As another example illustrated in FIG. 14, the remote device 212B is used to control a motor 243 in a tool chest 244 to lock and unlock the doors and drawers of the tool chest.

Figure 15:
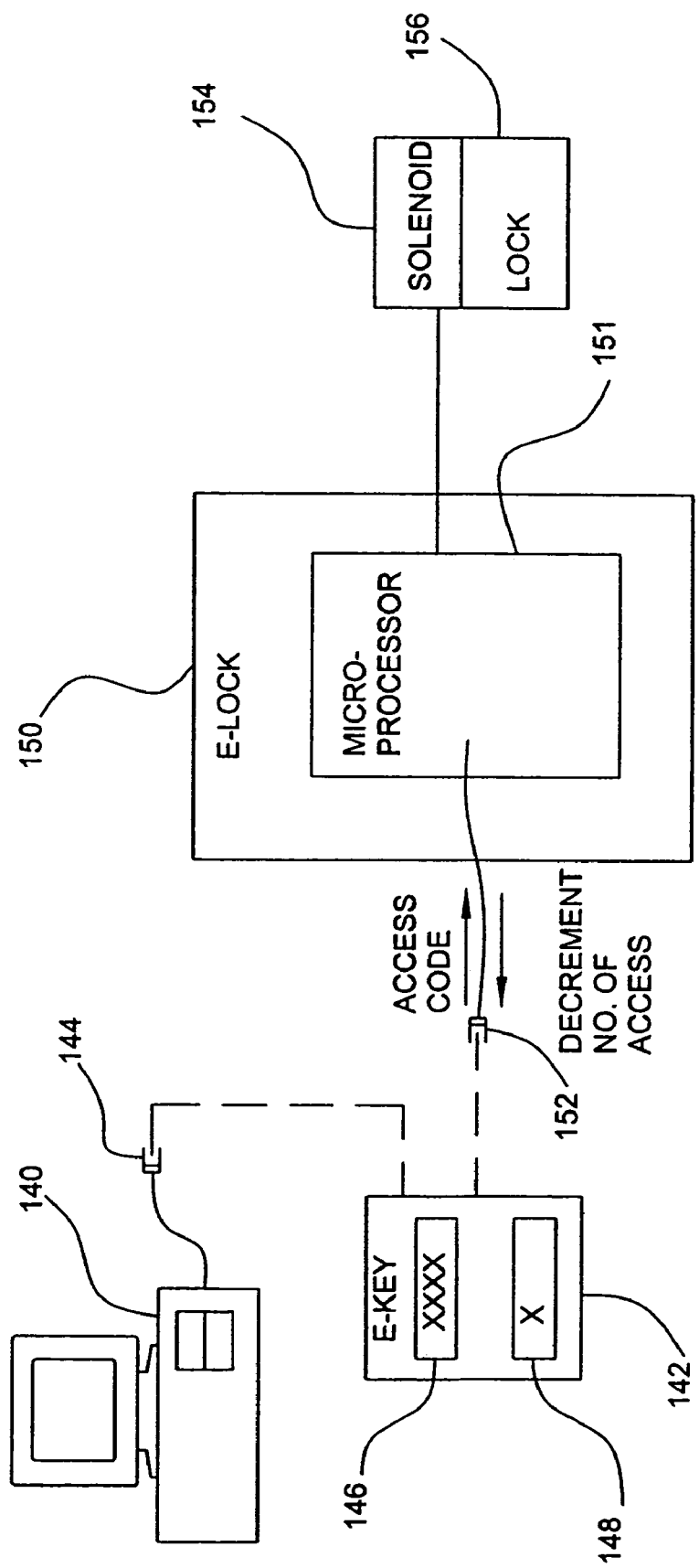
FIG. 15 is a schematic view showing an electronic access control system which has a master key for opening a plurality of remote electronic locks.
Figure 16:
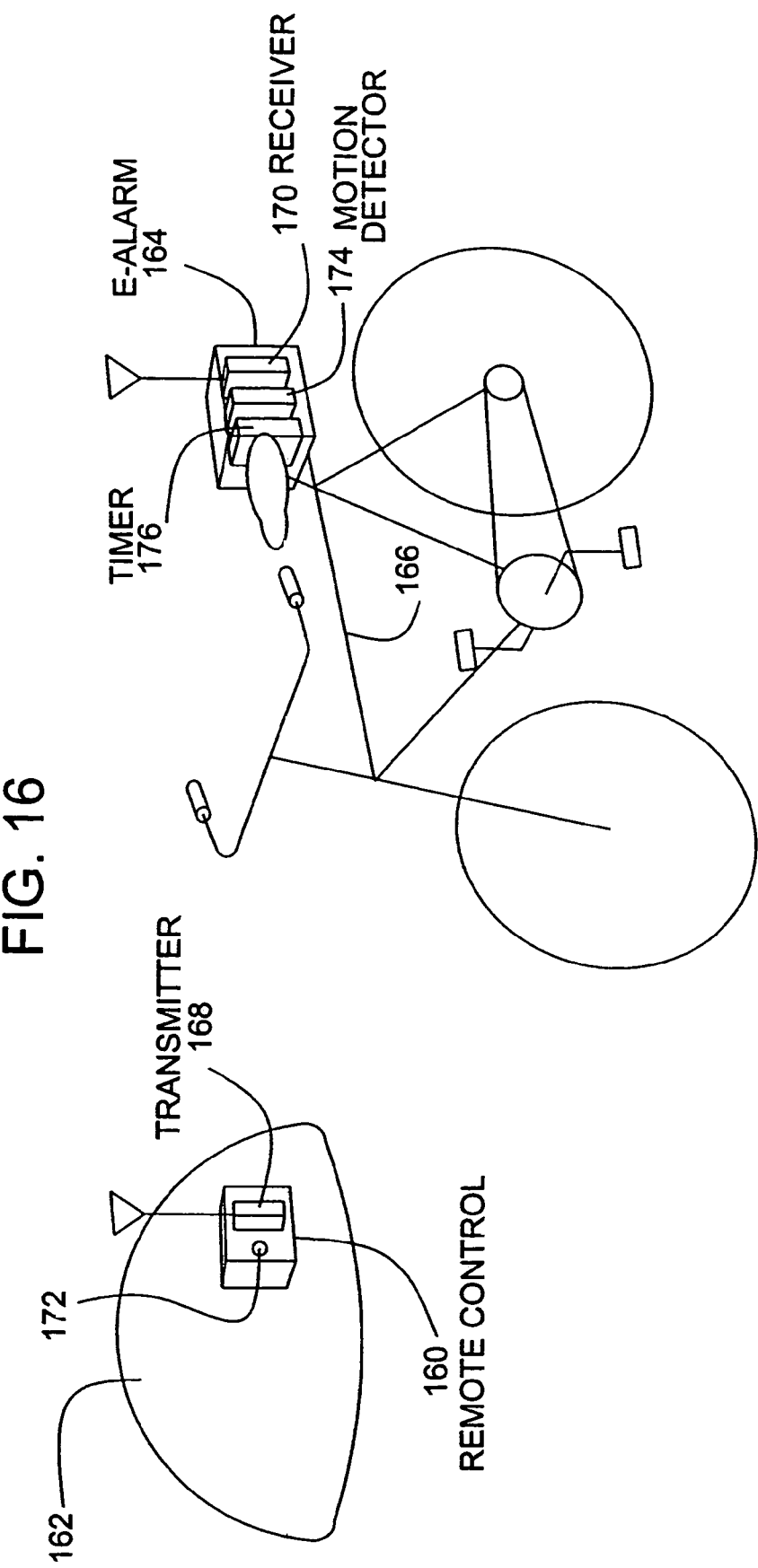
FIG. 16 is a schematic view of an electronic alarm system for a bicycle which has a remote control unit mounted in a riding helmet and an electronic alarm mounted on the bicycle.

In accordance with the object of the present invention to prevent the unauthorized use of electronic keys, there is provided an electronic access control system which has a plurality of remote electronic locks and a master key that has a number of access programmed therein. As illustrated in FIG. 15, the access control system includes a master control device 140 for programming a master access code and the desired number of access into the master key 142. In the illustrated embodiment, the master control device 140 is a personal computer which has an interface device 144, such as a key reader, for communicating with the master key. The master key 142 contains a non-volatile memory which includes an access code storage 146 for storing the master access code specific to the control system, and a counter 148 for storing the number of access allowed. Also shown in FIG. 15 is an electronic lock 150 which can be opened by the master key. The electronic lock has a control circuit based on a microprocessor 151 and a key reader 152 for communicating with the master key. When the master key 142 is presented to the key reader 152, the microprocessor 151 of the electronic lock reads the access code stored in the master key and compares that code to a preset master access code stored in its memory. If the two codes match, the control circuit reads the number of access stored in the master key. If the number of access is one or greater, the microprocessor 151 energizes the solenoid 154 to open the lock 156. In conjunction with the opening of the lock, the microprocessor 151 of the electronic lock 150 decrements the number of access stored in the counter 148 of the master key by one. Thus, if the number of access in the counter 148 is initially set to one, after the opening of the lock the counter is reduced to zero, and the master key cannot be used to open another lock.

In this way, by limiting the number of times the master key 142 can be used to open locks, the unauthorized use of the master key is effectively prevented. For instance, in the setting of a hotel, it is necessary to have a mater key for opening the electronic locks installed in the safes in the hotel rooms. If a hotel guest forgets the access code for the safe in his room, the master key can be programmed with the number of access set to one, and used to open that safe. Since the number of access will be reduced to zero after the lock is opened, the master key cannot be subsequently used to open the safe in another room. The use of the master key is thus strictly controlled.

In accordance with another aspect of the invention, there is provided an alarm system for a bicycle or a similar manually powered vehicle. As illustrated in FIG. 15, this alarm system includes a remote control 160 mounted in the helmet 162 of the rider of the bicycle 166, and an electronic alarm 164 mounted on the bicycle. The remote control 160 has a transmitter 168 for the wireless transmission of a communication code and other types of control signals to the alarm 164 on the bicycle, which has a receiver 170 for receiving the transmitted signals.

In the preferred embodiment, the remote control 160 has a button 172 which when pushed transmits a control signal including the communication code to the alarm 164 on the bicycle to activate or deactivate the alarm. Alternatively, the helmet may be equipped with a keypad for entering an access code by the user. After receiving the access code, the remote control compares the entered access code with a preset access code and transmits the control signals to the electronic alarm on the bicycle when the two access codes match.

The alarm 164 includes a motion detector 174 for sensing the movement of the bicycle 166. If movement of the bicycle is detected by the motion detector 174 when the alarm has been activated, the electronic alarm 164 emits audio and/or visual warning signals to deter the potential theft. A timer 176 is included in the electronic alarm 164 to stop the warning signals after a predetermined amount of time has elapsed.

This bicycle alarm system which has a remote control 172 mounted in the riding helmet 162 has many advantages. Combining the remote control with the riding helmet provides significant convenience to the rider because there is no need to carry the remote control separately. Moreover, because the remote control is integrated in the helmet of the rider, the rider is less likely to lose or misplace the remote control. Furthermore, because the remote control is required to deactivate the alarm system, combining the remote control with the helmet provides an incentive for the rider to wear the helmet when riding the bicycle. In this way, the bicycle alarm system of the present invention contributes to the safety of the rider and helps the rider to obey the law requiring the bicycle rider to wear a helmet.

We claim:

1. An electronic access control device powered by a battery capable of detecting a portable remote device for transmitting an electromagnet signal with an access code, the electronic access control device comprising:
   a circuit having a first portion deactivated during a first time period, wherein the circuit draws less than 100 microamps from the battery during the first time period;
   a second portion of the circuit enabled during a second time period;
   a third portion of the circuit having an enable output signal generated in response to a sensed signal of a radio frequency;
   a fourth portion of the circuit being enabled for an extended time period that is greater than the second time period, wherein the circuit draws greater than 100 micro-amps from the battery during the extended time period;
   a fifth portion of the circuit comprising a first processor having an input code output obtained, at least in part, from the sensed electromagnetic signal and during the extended time period;
   a second processor temporarily enabled by the first processor prior to the second processor receiving the input code having an output signal generated if the input code matches an authorization code for authorizing operation of a latch or alarm; and,
   a driver comprising an electronic circuit and having an output generated in response to the output signal generated by the second processor.

2. The device of claim 1 further comprising a keypad operatively connected to the first or second processor for entering an input code to access the device.

3. The device of claim 1, further comprising a program key operatively connected to the first or second processor for enabling a program operation.

4. The device of claim 1, further comprising a low-battery detection circuit enabled by the first or second processor for measuring a battery voltage, and wherein the low-battery detection circuit is periodically enabled and disabled.

5. The device of claim 1, further comprising a communication port operatively connected to the first or second processor for sending a code to the first or second processor while the first or second processor is enabled from a device remote to the electronic access control device that is stored into a memory and wherein the enabled first or second processor is disabled sometime thereafter.

6. The device of claim 1, further comprising at least one of the following responsive to the output of the driver; a lock actuator; a solenoid; an electromechanical relay; a motor; a solid-state relay; and, an alarm.

7. The device of claim 1, further comprising a communication port operatively connected to the first or second processor, and wherein the first or second processor is programmed to transmit an access code stored in a memory through the communication port to a device remote to the electronic access control device while the first or second processor is enabled wherein the enabled first or second processor is disabled sometime thereafter.

8. The device of claim 1, wherein a serial number is stored in a non-volatile memory.

9. The device of claim 1, wherein an access code non-reprogrammable via a keypad is stored in a non-volatile memory.

10. The device of claim 1, wherein a memory contains a limit value.

11. An electronic access control device capable of detecting a portable remote device for transmitting an electromagnet signal with an access code, the electronic access control device comprising:
   a first circuit comprising an oscillator and having a first circuit output signal;
   a second circuit temporarily enabled in response to the first circuit output signal, the second circuit having a second circuit output signal generated in response to a signal of radio frequency;
   a third circuit comprising a first processor temporarily enabled during the receipt of an electromagnetic signal, the circuit having a third circuit output signal comprising an input code obtained, at least in part, from the electromagnetic signal;
   a fourth circuit comprising a second processor temporarily enabled by the first processor prior to the second processor receiving the input code to compare the input code to an authorization code for authorizing operation of a device comprising a latch or alarm; and, a driver comprising an electronic circuit and having an output that is provided to the device if the input code matches the authorization code.

12. The device of claim 11 further comprising a keypad operatively connected to the first or second processor for entering an input code to access the device.

13. The device of claim 11 further comprising a program key operatively connected to the first or second processor for enabling a program operation.

14. The device of claim 11, the device comprising at least one of the following: a lock actuator; a solenoid; an electromechanical relay; a motor; a solid-state relay; and, an alarm.

15. The device of claim 11, further comprising a low-battery detection circuit enabled by the first or second processor for measuring a battery voltage, and wherein the low-battery detection circuit is temporarily enabled and disabled.

16. The device of claim 11, wherein a serial number is stored in a non-volatile memory.

17. The device of claim 11, further comprising a communication port operatively connected to the first or second processor for sending a code to the first or second processor while the first or second processor is enabled from a device remote to the apparatus that is stored into a memory and wherein the enabled first or second processor is disabled sometime thereafter.

18. The device of claim 11, further comprising a communication port operatively connected to the first or second processor, and wherein the first or second processor is programmed to transmit an access code stored in a memory through the communication port to a device remote to the apparatus while the first or second processor is enabled and wherein the enabled the first or second processor is disabled sometime thereafter.

19. An electronic access control device capable of detecting a portable remote device for transmitting an electromagnet signal with an access code, the electronic access control device comprising:

an oscillator having an output comprising a plurality of duty cycles;

a circuit that is periodically enabled for a time $t_1$ and disabled for a time $t_2$ for sensing a signal via an antenna during at least one of the duty cycles;

a portion of the circuit comprising a first processor that generates an input code obtained, at least in part, from an electromagnetic signal;

a second processor temporarily enabled that compares the input code to an authorization code for authorizing operation of a device comprising a latch or alarm; and, a switch that is controlled upon sensing a signal via an antenna, enables the portion of the circuit as the input code is being received for a time $t_3$ that is greater than the time $t_1$.

20. The device of claim 19 further comprising a keypad operatively connected to the first or second processor for entering an input code to access the device.

21. The device of claim 19 further comprising a program key operatively connected to the first or second processor for enabling a program mode.

22. The device of claim 19 further comprising low-battery detection circuit enabled by the first or second for measuring a battery voltage, and wherein the low-battery detection circuit is temporarily enabled and disabled.

23. The device of claim 22, the device comprising at least one of the following: a lock actuator, a solenoid, an electromechanical relay; a motor; a solid-state relay; and, a generator sound.

24. The device of claim 19 further comprising a program key wherein the first or second processor is programmed to enter a code program operation in response to pressing of the program key.

25. The device of claim 19 wherein a serial number is stored in a non-volatile memory.

26. The device of claim 19 wherein the driver has a first state and a second state, the driver output signal providing a higher non-zero power output in the first state than in the second state, a signal for triggering a transition from the first state to the second state.

27. The device of claim 19 further comprising a communication port operatively connected to the first or second processor for sending a code to the first or second processor while the first or second processor is enabled from a remote device to the electronic access control device that is stored into a memory and wherein the enabled first or second processor is disabled sometime thereafter.

28. The device of claim 19 further comprising a communication port operatively connected to the first or second processor, and wherein the first or second processor is programmed to transmit an access code stored in a memory through the communication port to a device remote to the access control device while the first or second processor is enabled and wherein the enabled first or second processor is disabled sometime thereafter.

29. An electronic access control circuit operating on current drained from a battery mounted about a device to be secured, the circuit comprising:

an electronic circuit for sensing a signal of radio frequency and having an output that indicates detection of a portable remote device for transmitting an electromagnetic signal;

a circuit comprising a first processor temporarily enabled that obtains an input code transmitted via the electromagnetic signal;

a circuit portion that, in response to an input, increases the current drained from the battery;

a second processor temporarily enabled that receives an input code from the electronic circuit and compares the input code to an authorization code for authorizing operation of a device comprising a latch or alarm;

the electronic circuit capable of providing an output to the device if the input code matches the authorization code; and, wherein the circuit portion decreases the current drained from the battery after receiving the input code.

30. The circuit of claim 29 further comprising a keypad operatively connected to the first or second processor for entering an input code to access the device.

31. The circuit of claim 29, further comprising a program key operatively connected to the first or second processor for enabling a program operation.

32. The circuit of claim 29, further comprising a low-battery detection circuit enabled by the first or second for measuring a battery voltage, and wherein the low-battery detection circuit is temporarily enabled and disabled.

33. The circuit of claim 29, the device comprising at least one of the following: a lock actuator, a solenoid, an electromechanical relay; a motor; a solid-state relay; and, a generator sound.

34. The circuit of claim 29, wherein the driver has a first state and a second state, the driver output signal providing a higher non-zero power output in the first state than in the second state, and a signal for triggering a transition from the first state to the second state.

35. The circuit of claim 29, further comprising a communication port operatively connected to the first or second for sending a code to the first or second processor while the first or second processor is enabled from a device remote to the circuit that is stored into a memory and wherein the enabled first or second processor is disabled sometime thereafter.

36. The circuit of claim 29, further comprising a communication port operatively connected to the first or second processor, and wherein the first or second processor is programmed to transmit an access code stored in a memory through the communication port to a device remote to the circuit while the first or second processor is enabled and wherein the enabled first or second processor is disabled sometime thereafter.

37. A method comprising the steps of:
deactivating a circuit powered by a battery during a first time period wherein the circuit draws less than 100 micro-amps;
enabling a portion of a circuit for a second time period;
monitoring for a signal during the second time period;
enabling a circuit for an extended time period that is greater than the second time period upon the sensing of a signal of radio frequency, wherein the circuit draws greater than 100 micro-amps;
utilizing a first processor to process an electromagnetic signal received during the extended time period to obtain an input code, at least in part, from the electromagnetic signal;
utilizing a second processor to compare the obtained input code to an authorization code by the first processor temporarily enabled in response to receipt of the input code for authorizing operation of a device comprising a latch or alarm; and,
providing a signal to the device if the input code matches the authorization code.

38. The method of claim 37, further comprising the steps of periodically enabling and disabling a low-battery detection circuit for measuring a battery voltage.

39. The method of claim 37, further comprising the step of writing an access code into a memory received by the enabled first or second processor through a communication port from a device remote to the circuit in response to a write signal and wherein the enabled first or second processor is disabled sometime thereafter.

40. The method of claim 37, further comprising the step of operating at least one of the following in response to the signal to the device: an electromechanical driver; a lock actuator; a solenoid; a motor; an electromechanical relay; a solid-state relay; and, sound generator.

41. The method of claim 37, further comprising the steps providing a non-zero power output to the device, providing a lower non-zero power to the device, and transitioning from the non-zero power output to the lower non-zero power output.

42. The method of claim 37, further comprising the step of pressing a program key prior to entering an access code that is stored in a memory.

43. The method of claim 37, further comprising the step of an enabled first or second processor transmitting an access code through a communication port to a device remote to the circuit in response to a read signal and wherein the enabled first or second processor is disabled sometime thereafter.

44. The method of claim 37, further comprising the step of entering an access code via a keypad and storing the code in a memory.

45. The method of claim 37, further comprising the step of entering an access code via a keypad and comparing the code to a code stored in a memory.

46. A method comprising the steps of:
periodically enabling and disabling a circuit comprising a first processor during each of a plurality of duty cycles wherein the circuit is enabled for a time $t_1$ during each of the duty cycles;
obtaining an input code transmitted via an electromagnetic signal;
a second processor separate from the circuit temporarily enabled in response to receipt of the input code comparing the input code to an authorization code for authorizing operation of a device comprising a latch or alarm;
sensing a signal via an antenna for enabling the circuit as the input code is being obtained for a time $t_2$ that is greater than said time $t_1$; and,
providing a signal to the device if the input code matches the authorization code.

47. The method of claim 46, further comprising the steps of periodically enabling and disabling a low-battery detection circuit for measuring a battery voltage.

48. The method of claim 46, further comprising the step of an enabled first or second processor writing an access code into a memory received through a communication port from a device remote to the circuit in response to a write signal and wherein the enabled first or second processor is disabled sometime thereafter.

49. The method of claim 46, further comprising the step of an enabled first or second processor transmitting an access code through a communication port in response to a read signal to a device remote to the circuit and wherein the enabled first or second processor is disabled sometime thereafter.

50. The method of claim 46, further comprising the step of entering an access code via a keypad and storing the code in a memory.

51. The method of claim 46, further comprising the step of entering an access code via a keypad and comparing the code to a code stored in a memory.

52. The method of claim 46, further comprising the step of operating at least one of the following in response to the signal to the device: an electromechanical drive; a lock actuator; a solenoid; a motor; and electromechanical relay, a solid-state relay; and, a sound generator.

53. The method of claim 46, further comprising the step pressing a program key prior to entering an access code that is stored in a memory.

54. A method for operating a circuit on current drained from a battery comprising the steps of:
sensing a signal of radio frequency and generating a signal to indicate detection of a device capable of providing an electromagnetic signal;
receiving an input code transmitted by the electromagnetic signal obtained by a first temporarily enabled first circuit comprising a first processor;
increasing the current drained from the battery;
comparing the input code to an authorization code by a second processor temporarily enabled in response to receipt of the input code for authorizing operation of a device comprising a latch or alarm;
providing an output to the device if the input code matches the authorization code; and, decreasing the current drained from the battery after comparing the input code.

55. The method of claim 54, further comprising the steps of periodically enabling and disabling a low-battery detection circuit for measuring a battery voltage.

56. The method of claim 54, further comprising the step of an enabled first or second processor writing an access code into a memory received through a communication port from a device remote to the circuit in response to a write signal and wherein the enabled first or second processor is disabled sometime thereafter.

57. The method of claim 54, further comprising the step of an enabled first or second processor transmitting an access code through a communication port in response to a read signal to a device remote to the circuit and wherein the enabled first or second processor is disabled sometime thereafter.

58. The method of claim 54, further comprising the step of entering an access code via a keypad and storing the code in a memory.

59. The method of claim 54, further comprising the step of operating at least one of the following in response to the signal to the device: an electromechanical driver; a lock actuator; a solenoid; a motor; an electromechanical relay; a solid-state relay; and, a sound generator.

60. The method of claim 54, further comprising the step of entering an access code via a keypad and comparing the code to a code stored in a memory.

61. The method of claim 54, further comprising the step of pressing a program key prior to entering an access code that is stored in memory.

62. The apparatus of claim 11 wherein the signal is digital.

63. A method comprising the steps of:
deactivating a first circuit in a first device during a first time period;
enabling a portion of the first circuit for a second time period by an oscillator signal;
enabling an additional portion of the first circuit, sensing an electromagnetic signal sent from a remote second device and obtaining an access code during a third time period, wherein the third time period is longer than the second time period;
processing in a first processor the electromagnetic signal to obtain an input code, enabling a second processor and sending the input code to the second processor;
comparing in the second processor the input code to an authorization code for authorizing operation of a device comprising a latch or alarm; and,
providing a signal to the device if the input code matches the authorization code.

64. The method of claim 63 further comprising the step of entering an access code via a keypad and storing the code in a memory.

65. The method of claim 63 further comprising the step of entering an access code via a keypad and comparing the code to a code stored in a memory.

66. The method of claim 63 further comprising the step of pressing a program key prior to entering an access code that is stored in a memory.

67. The method of claim 63 further comprising the steps of periodically enabling and disabling a low-battery detection circuit for measuring a battery voltage.

68. The method of claim 63 further comprising the steps of providing a non-zero power output to the device, providing a lower non-zero power to the device, and transitioning from the non-zero power output to the lower non-zero power output.

69. The method of claim 63 further comprising the step of an enabled first or second processor writing an access code into a memory received through a communication port in response to a write signal from a device remote to the circuit, and wherein the enabled first or second processor is disabled sometime thereafter.

70. The method of claim 63 further comprising the step of an enabled first or second processor transmitting an access code through a communication port in response to a read signal from a device remote to the circuit, and wherein the enabled first or second processor is disabled sometime thereafter.

71. The device of claim 29, wherein a serial number is stored in a non-volatile memory.

72. The device of claim 1, wherein an access code non-reprogrammable via a keypad is stored in a non-volatile memory.

73. The device of claim 11, wherein an access code non-reprogrammable via a keypad is stored in a non-volatile memory.

74. The device of claim 19, wherein an access code non-reprogrammable via a keypad is stored in a non-volatile memory.

75. The device of claim 29, wherein an access code non-reprogrammable via a keypad is stored in a non-volatile memory.

76. The device of claim 1, wherein a memory contains a limit value.

77. The device of claim 11, wherein a memory contains a limit value.

78. The device of claim 19, wherein a memory contains a limit value.

79. The device of claim 29, wherein a memory contains a limit value.

80. The device of claim 2, wherein the keypad receives an access code which is stored in a memory.

81. The device of claim 12, wherein the keypad receives an access code which is stored in a memory.

82. The device of claim 20, wherein the keypad receives an access code which is stored in a memory.

83. The device of claim 30, wherein the keypad receives an access code which is stored in a memory.

84. The device of claim 3, wherein the program key is pressed prior to storing the access code in a memory.

85. The device of claim 13, wherein the program key is pressed prior to storing the access code in a memory.

86. The device of claim 21, wherein the program key is pressed prior to storing the access code in a memory.

87. The device of claim 31, wherein the program key is pressed prior to storing the access code in a memory.

88. The device of claim 2, wherein the keypad receives an access code which is compared to an access code stored in a memory.

89. The device of claim 12, wherein the keypad receives an access code which is compared to an access code stored in a memory.

90. The device of claim 20, wherein the keypad receives an access code which is compared to an access code stored in a memory.

91. The device of claim 30, wherein the keypad receives an access code which is compared to an access code stored in a memory.

92. The device of claim 1, wherein the second processor is shielded from external access.

93. The device of claim 11, wherein the second processor is shielded from external access.

94. The device of claim 19, wherein the second processor is shielded from external access.

95. The device of claim 29, wherein the second processor is shielded from external access.

96. The device of claim 2 further comprising a circuit generating a wake-up signal in response to pressing a key on the keypad, wherein the first or second processor is woke-up for a period of time in response to the wake-up signal and receiving an input code.

97. The device of claim 96 wherein the circuit generating a wake-up signal is in response to pressing a first key on said keypad used in entering said input code comprising the first key and at least one subsequent keypad entry.

98. The device of claim 12 further comprising a circuit generating a wake-up signal in response to pressing a key on the keypad, wherein the first or second processor is woke-up for a period of time in response to the wake-up signal and receiving an input code.

99. The device of claim 98 wherein the circuit generating a wake-up signal is in response to pressing a first key on said keypad used in entering said input code comprising the first key and at least one subsequent keypad entry.

100. The device of claim 20 further comprising a circuit generating a wake-up signal in response to pressing a key on the keypad, wherein the first or second processor is woke-up for a period of time in response to the wake-up signal and receiving an input code.

101. The device of claim 100 wherein the circuit generating a wake-up signal is in response to pressing a first key on said keypad used in entering said input code comprising the first key and at least one subsequent keypad entry.

102. The device of claim 30 further comprising a circuit generating a wake-up signal in response to pressing a key on the keypad, wherein the first or second processor is woke-up for a period of time in response to the wake-up signal and receiving an input code.

103. The device of claim 102 wherein the circuit generating a wake-up signal is in response to pressing a first key on said keypad used in entering said input code comprising the first key and at least one subsequent keypad entry.

104. The access control device of claim 29, further comprising a program key wherein the first or second processor is programmed to enter a code program operation in response to pressing of the program key.

105. The access control device of claim 104 wherein an input code is stored in a memory during the code program operation.

106. The access control device of claim 24 wherein an input code is stored in a memory during the code program operation.

107. The access control device of claim 80 wherein an input code is stored in a memory during the code program operation.

108. The access control device of claim 80 wherein an input code is stored in a memory during the code program operation.

109. The access control device of claim 1, wherein the first or second processor is operatively connected to a keypad for receiving user inputs entered through pressing the keys of the keypad, the first or second processor being configured to enter a code programming operation in response to pressing of a program key, receive an input code through the keypad in response to detecting the pressing of the program key, and store the input code in the memory.

110. The access control device of claim 11, wherein the first or second processor is operatively connected to a keypad for receiving user inputs entered through pressing the keys of the keypad, the first or second processor being configured to enter a code programming operation in response to pressing of a program key, receive an input code through the keypad in response to detecting the pressing of the program key, and store the input code in the memory.

111. The access control device of claim 19, wherein the first or second processor is operatively connected to a keypad for receiving user inputs entered through pressing the keys of the keypad, the first or second processor being configured to enter a code programming operation in response to pressing of a program key, receive an input code through the keypad in response to detecting the pressing of the program key, and store the input code in the memory.

112. The access control device of claim 29, wherein the first or second processor is operatively connected to a keypad for receiving user inputs entered through pressing the keys of the keypad, the first or second processor being configured to enter a code programming operation in response to pressing of a program key, receive an input code through the keypad in response to detecting the pressing of the program key, and store the input code in the memory.

113. The access control device of claim 19, wherein an input code is communicated from a biometric identification device for recognizing a user and compared to the authorization code or another authorization code.

114. The access control device of claim 29 wherein an input code is communicated from a biometric identification device for recognizing a user and compared to the authorization code or another authorization code.

115. An access control device consistently mounted about a device to be secured, the access control device comprising:
   a non-volatile memory containing a stored code communicated via a conductively connected communication means for communicating said code;
   a circuit generating a wake-up signal in response to pressing a key on a keypad;
   a first processor that is woke-up for a period of time in response to the wake-up signal and receiving an input code; and,
   a second processor shielded from external access compares the input code with the stored access code, and generates a signal to activate a lock actuator if the input code matches the stored access code, wherein the first and second processors enter a sleep mode after the period of time, the sleep mode enabling the first or second processor to operate at a lower power consumption rate than when the processors are awake.

116. An electronic access control device consistently mounted about a device to be secured, the access control device comprising:
   first and second controllers operatively connected to each other and separated from each other, wherein the second controller is shielded from external access and comprising a memory for storing a communication code;
   the second controller receiving a request and transmitting the communication code to the first controller;
   the first controller receiving an input access signal from a key or keypad, and comparing the input access signal to a stored access code to determine if the input access code is valid;
   the first controller sending the communication code to the second controller if the input access code is valid, wherein the second controller provides a signal to energize a circuit to access a lock.

117. The method of claim 37 whereby the circuit is enabled for an extended time period upon sensing a signal of a particular frequency.

118. The access control device of claim 1 whereby the enable output signal is generated in response to a sensed signal of a particular frequency.

119. The access control device of claim 11 whereby the second circuit output signal is generated in response to a sensed signal of a particular frequency.

120. The method of claim 63 further comprising a battery powering the circuit whereby the battery supplies less than 100 micro-amps to the circuit during the first time period and greater than 100 micro-amps to the circuit during the third time period.

121. The electronic access control device of claim 11 whereby at least one circuit is powered by a battery that supplies less than 100 micro-amps of current during a disabled mode and greater than 100 micro-amps during an enabled mode.

122. The electronic access control device of claim 19 whereby the circuit is powered by a battery that supplies less than 100 micro-amps of current during time t2 and greater than 100 micro-amps during time t3.

123. The electronic access control device of claim 116, wherein the communication code is substantially permanently stored in the memory of the second controller.

124. The electronic access control device of claim 116, wherein the second controller transmits the communication code to the first controller during initialization.

125. The electronic access control device of claim 116, wherein the second controller transmits the communication code to the first controller before the first controller receives the input access signal.

126. The electronic access control device of claim 116, further comprising a low-battery detection circuit enabled by the first or second controller for measuring a battery voltage.

127. The electronic access control device of claim 116, wherein the circuit to access the lock has a first state and a second state, the circuit providing a higher non-zero power output in the first state than in the second state, and a timer for triggering a transition from the first state to the second state.

128. The electronic access control device of claim 116, further comprising a communication port operatively connected to the first or second controllers for sending the access code to the first or second controllers that is written into the memory.

129. The electronic access control device of claim 116, wherein the first or second controllers are programmed to receive a serial number for the device through the communication port and write the serial number into the memory.

130. The electronic access control device of claim 116, wherein the first or second controllers are programmed to transmit the access code through a communication port.

131. The electronic access control device of claim 116, wherein the first or second controllers transmit the serial number through a communication port.

132. The electronic access control device of claim 116, wherein at least one of the controllers has a sleep mode and an operation mode and wherein more power is consumed by the controller in the operation mode.

133. The electronic access control device of claim 132, wherein the at least one controller periodically switches from the sleep mode to the operation mode.

134. The electronic access control device of claim 132, wherein the at least one controller switches from the sleep mode to the operation mode upon receiving an input code.

135. The electronic access control device of claim 116, wherein the key contains a limit value for limiting the operation of the key.

136. The electronic access control device of claim 135, wherein the limit value of the key is programmed by a computer remote to the access control device.

137. The electronic access control device of claim 127, wherein the communication port is electrically separate from the port that receives the input access signal.

138. The electronic access control device of claim 128, wherein the communication port is electrically separate from the port that receives the input access signal.

139. The electronic access control device of claim 129, wherein the communication port is electrically separate from the port that receives the input access signal.

140. The electronic access control device of claim 131, wherein the communication port is electrically separate from the port that receives the input access signal.

141. For an electronic access control device consistently mounted about a device to be secured, a method comprising the steps:
    containing a communication code within a memory of a second controller separated from and operatively connected to a first controller, the second controller shielded from external access;
    receiving a request and transmitting the communication code from the second controller to the first controller;
    transmitting an input access signal from a key or keypad to the first controller; comparing the input access signal to a stored access code to determine if the input access code is valid; and,
    sending the communication code to the second controller if the input access code is valid, wherein the second controller energizes a circuit to access a lock.

142. The method of claim 141, wherein the communication code is a substantially permanent code in the memory of the second controller.

143. The method of claim 141, wherein transmitting the communication code from the second controller to the first controller occurs during initialization.

144. The method of claim 141, wherein transmitting the communication code from the second controller to the first controller occurs before the first controller receives the input access signal.

145. The method of claim 141 further comprising the steps of enabling a low-battery detection circuit with the first or second controller for measuring a battery voltage, and disabling the low-battery detection circuit.

146. The method of claim 141 further comprising the steps of the electromechanical driver has a first state and a second state, the driver output signal providing a higher non-zero power output in the first state than in the second state, and a timer for triggering a transition from the first state to the second state.

147. The method of claim 141 further comprising the step of sending the access code to the microprocessor that is written into the memory via a communication port.

148. The method of claim 141 further comprising the steps of receiving a serial number through a communication port and writing the serial number into the memory.

149. The method of claim 141 further comprising the step of transmitting the access code through a communication port.

150. The method of claim 141 further comprising the step of transmitting a serial number stored in the memory through a communication port.

151. The method of claim 141 further comprising the step of at least one controller switching from a sleep mode to an operation mode and wherein more power is consumed by the controller in the operation mode.

* * * * *